(12) United States Patent
Mubarek

(10) Patent No.: US 11,867,528 B2
(45) Date of Patent: Jan. 9, 2024

(54) METHOD, APPARATUS, AND SYSTEM FOR PROVIDING ROAD CLOSURE GRAPH INCONSISTENCY RESOLUTION

(71) Applicant: HERE GLOBAL B.V., Eindhoven (NL)

(72) Inventor: Ömer Mubarek, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 484 days.

(21) Appl. No.: 16/228,093

(22) Filed: Dec. 20, 2018

(65) Prior Publication Data

US 2020/0200543 A1 Jun. 25, 2020

(51) Int. Cl.
| | | |
|---|---|---|
| G01C 21/00 | (2006.01) | |
| G01C 21/30 | (2006.01) | |
| G08G 1/09 | (2006.01) | |
| G08G 1/0965 | (2006.01) | |

(52) U.S. Cl.
CPC ......... G01C 21/3859 (2020.08); G01C 21/30 (2013.01); G01C 21/3815 (2020.08); G01C 21/3867 (2020.08); G08G 1/091 (2013.01); G08G 1/0965 (2013.01)

(58) Field of Classification Search
None
See application file for complete search history.

(56) References Cited

U.S. PATENT DOCUMENTS

| | | | |
|---|---|---|---|
| 9,816,823 B2 | 11/2017 | Wang et al. | |
| 9,818,295 B2 | 11/2017 | Kesting et al. | |
| 2014/0236464 A1* | 8/2014 | Gueziec | G08G 1/096775 701/117 |
| 2016/0033298 A1 | 2/2016 | Duang et al. | |
| 2016/0275787 A1* | 9/2016 | Kesting | G08G 1/0112 |
| 2017/0314934 A1* | 11/2017 | Averbuch | G01S 19/50 |
| 2018/0202816 A1 | 7/2018 | Kesting et al. | |
| 2018/0209797 A1* | 7/2018 | Kesting | G08G 1/0112 |

(Continued)

OTHER PUBLICATIONS

WO-2010105712-A1, Balcaen Leen, Sep. 2010 (Year: 2010).*

(Continued)

*Primary Examiner* — James M McPherson
*Assistant Examiner* — Bakari Underwood
(74) *Attorney, Agent, or Firm* — DITTHAVONG, STEINER & MLOTKOWSKI

(57) ABSTRACT

An approach is provided for resolving an inconsistency in road closure data stored in a mapping platform. The approach, for example, involves processing map data to generate a roadway graph representing a spatial relationship between a first road segment and a second road segment. The spatial relationship indicates that a first closure state of the first road segment cannot differ from a second closure state of the second road segment. The approach also involves determining that the inconsistency in the road closure data for the first road segment and the second road segment indicates that first closures state and the second closure state do not match. The approach further involves changing the road closure data stored in the mapping platform either to match the first road closure state with the second road closure state, or to match the second road closure state with the first road closure state in response to the inconsistency.

20 Claims, 18 Drawing Sheets

(56) References Cited

U.S. PATENT DOCUMENTS

2020/0158519 A1\* 5/2020 McGavran .............. H04W 4/44

OTHER PUBLICATIONS

Lu et al., "Estimating Dynamic Queue Distribution in a Signalized Network Through a Probability Generating Model", in IEEE Transactions on Intelligent Transportation Systems, vol. 15, No. 1, Feb. 2014, pp. 334-344.
Office Action for related European Patent Application No. 19218164. 2-1001, dated May 25, 2020, 9 pages.
Office Action for Related European Application No. 19 218 164.2-1009, dated Feb. 15, 2023, 7 pages.

\* cited by examiner

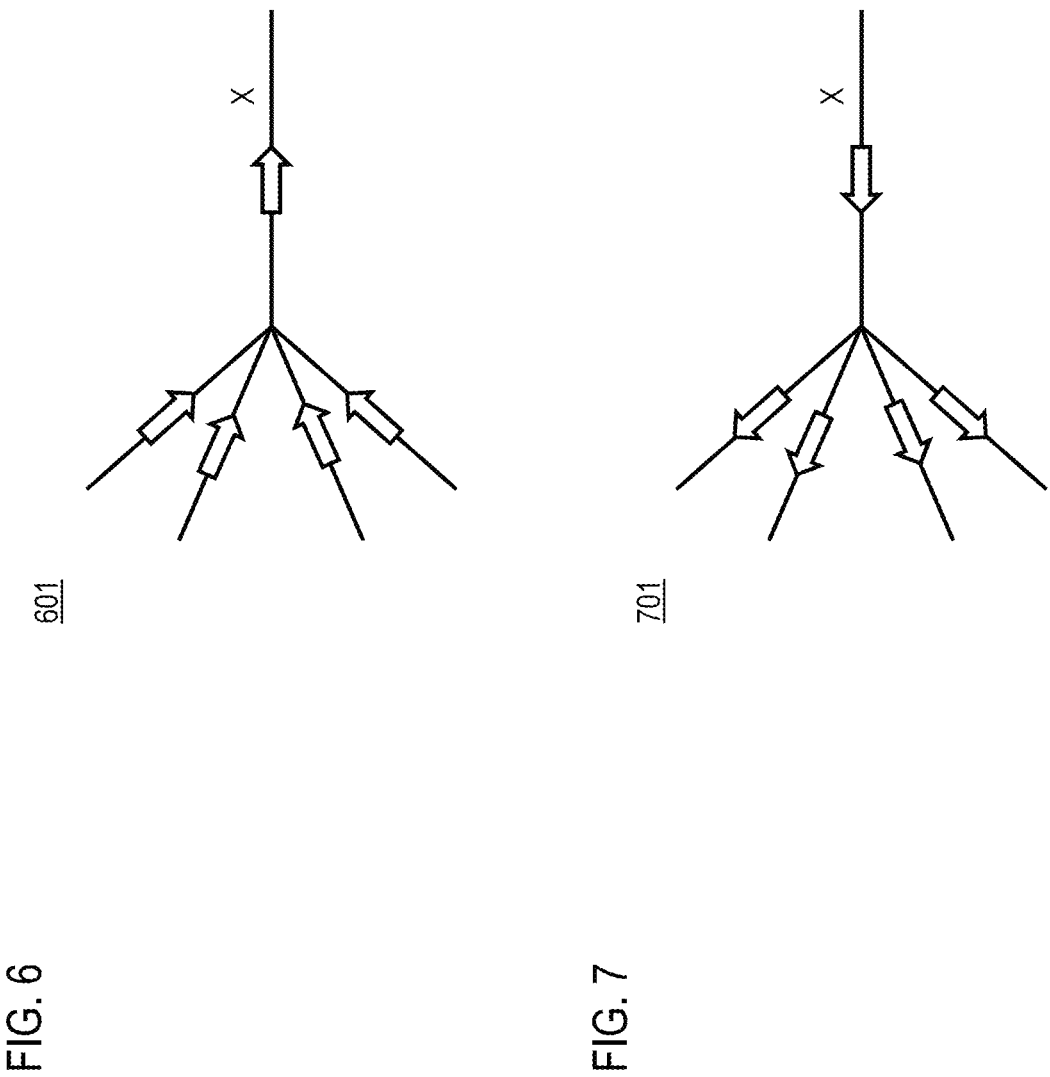

METHOD, APPARATUS, AND SYSTEM FOR PROVIDING ROAD CLOSURE GRAPH INCONSISTENCY RESOLUTION

BACKGROUND

Providing data on traffic incidents (e.g., abnormalities in traffic that can affect traffic flow such as accidents, lane closures, road closures, etc.) is an important function for map service providers. In particular, while most traffic incidents can have at least some negative impact on traffic, road closures can be the most severe because no cars can go through the affected roadway. The lack of knowledge about a road closure can have enormous negative impact on trip planning, routing, and estimated time of arrival. Therefore, traffic service providers face significant technical challenge to reporting road closures accurately. For example, road closure reports generally are reported with respect to individual road segments or links or a road network. This can create inconsistencies where adjacent or neighboring road segments may have different road closure states (e.g., open or closed) when such differing states are not likely to occur or is otherwise not possible.

Some Example Embodiments

Therefore, there is a need for automatically resolving potential inconsistencies between road closure states before, e.g., publishing road closure reports to end users.

According to one embodiment, a computer-implemented method comprises processing map data to generate a roadway graph representing a spatial relationship between a first road segment and a second road segment. The spatial relationship indicates that a first closure state of the first road segment cannot differ from a second closure state of the second road segment. The method also comprises determining that an inconsistency in the road closure data for the first road segment and the second road segment indicates that first closures state and the second closure state do not match. The method further comprises changing the road closure data stored in the mapping platform either to match the first road closure state with the second road closure state, or to match the second road closure state with the first road closure state in response to the inconsistency.

According to another embodiment, an apparatus comprises at least one processor, and at least one memory including computer program code for one or more computer programs, the at least one memory and the computer program code configured to, with the at least one processor, cause, at least in part, the apparatus to process map data to generate a roadway graph representing a spatial relationship between a first road segment and a second road segment. The spatial relationship indicates that a first closure state of the first road segment cannot differ from a second closure state of the second road segment. The apparatus is also caused to determine that an inconsistency in the road closure data for the first road segment and the second road segment indicates that first closures state and the second closure state do not match. The apparatus is further caused to change the road closure data stored in the mapping platform either to match the first road closure state with the second road closure state, or to match the second road closure state with the first road closure state in response to the inconsistency.

According to another embodiment, a non-transitory computer-readable storage medium carries one or more sequences of one or more instructions which, when executed by one or more processors, cause, at least in part, an apparatus to process map data to generate a roadway graph representing a spatial relationship between a first road segment and a second road segment. The spatial relationship indicates that a first closure state of the first road segment cannot differ from a second closure state of the second road segment. The apparatus is also caused to determine that an inconsistency in the road closure data for the first road segment and the second road segment indicates that first closures state and the second closure state do not match. The apparatus is further caused to change the road closure data stored in the mapping platform either to match the first road closure state with the second road closure state, or to match the second road closure state with the first road closure state in response to the inconsistency.

According to another embodiment, an apparatus comprises means for processing map data to generate a roadway graph representing a spatial relationship between a first road segment and a second road segment. The spatial relationship indicates that a first closure state of the first road segment cannot differ from a second closure state of the second road segment. The apparatus also comprises means for determining that an inconsistency in the road closure data for the first road segment and the second road segment indicates that first closures state and the second closure state do not match. The apparatus further comprises means for changing the road closure data stored in the mapping platform either to match the first road closure state with the second road closure state, or to match the second road closure state with the first road closure state in response to the inconsistency.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 6-8 are diagrams of example structures of a roadway graph for resolving road closure inconsistencies, according to one embodiment;

DESCRIPTION OF SOME EMBODIMENTS

Examples of a method, apparatus, and computer program for providing road closure graph inconsistency resolution are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
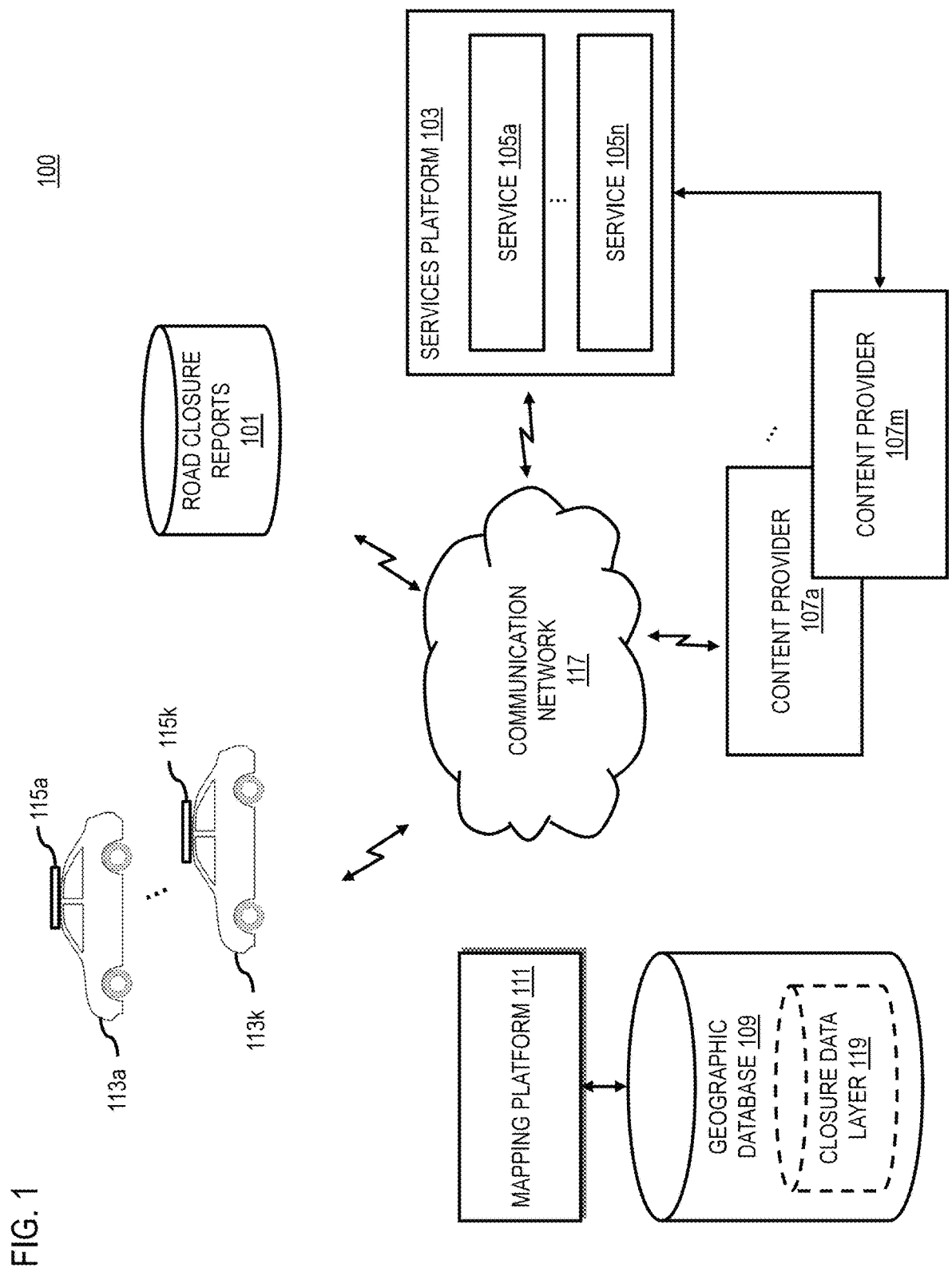
FIG. 1 is a diagram of a system capable of automatically resolving road closure inconsistencies, according to one embodiment.

FIG. 1 is a diagram of a system 100 capable of automatically resolving road closure inconsistencies, according to one embodiment. As noted above, information on road closures occurring in a road network can be important for providing services such as trip planning, navigation routing or guidance, estimating time of arrival, and/or the like. Generally, traffic incidents such as road closures (e.g., road closure reports 101) are published by government/municipality agencies, local police, and/or third-party official/semi-official sources (e.g., a services platform 103, one or more services 105a-105n, one or more content providers 107a-107m, etc.). By way of example, the published road closure reports 101 can specify the roadway (e.g., by name or matched to specific road link records of digital map data such as a geographic database 109) that has been closed or partially closed to traffic (e.g., vehicular and/or non-vehicular traffic). Closure refers, for instance, to restricting traffic flow on a particular roadway such that no vehicle or a reduced number of vehicle (e.g., reduced with respect to an average free flow traffic volume on the roadway) is permitted or able to travel on the roadway.

In one embodiment, a traffic provider (e.g., via a mapping platform 111) monitors the feeds of the road closures reports 101, extracts the affected roadways (e.g., road segments or links), and provides traffic data and/or other functions based on the road closure reports 101 (e.g., displays the location of reported closures on the map, generates navigation routes to avoid reported road closures, etc.). Then, traditional traffic service providers wait for another message or road closure report 101 indicating that the road has opened to provide updated data and/or functions. In one embodiment, this type of incident reporting is referred to as "journalistic reporting."

In one embodiment, journalistic incident reports can be coupled with other information (e.g., GPS probe information collected from vehicles 113a-113k, also collectively referred to as vehicles 113) and verified automatically. This process involves monitoring (e.g., by the mapping platform 111) the reported road segment for the duration of the report and determining the closure state (e.g., whether the road segment is closed or open) periodically or based on events as they occur (e.g., vehicle activity). This is called, for instance, an "automatic road closure verification" methodology.

Furthermore, independent of journalistic reports, the system 100 (e.g., via the mapping platform 111) can monitor a set of roadways and detect road closures in the absence of journalistic reports based, for instance, on vehicle probe data, road sensors, or equivalent. This methodology is referred to as "automatic road closure detection." In one embodiment, the automatic closure verification and detection mechanisms of the mapping platform 111 can calculate a closure likelihood score for a road segment and based on this score. Based on the road closure score, the mapping platform 111 can classify the closure states of monitor road segments to close roads that are open, to open roads that are closed, and/or to take no action.

Regardless of the mechanism used to determine road closures (e.g., journalistic reports, automatic verification and detection, etc.), there is a potential risk of creating inconsistent road closure reports. For instance, a construction report could result in the system 100 classifying a road A on which the construction is occurring as closed to vehicular traffic. If there exists another road, road B, whose traffic can only flow from road B to road A, technically B is also closed even though it does not have construction on it. This is because vehicles entering road B would have nowhere to go because road A is closed. Therefore, service provider face significant technical challenges to resolving this inconsistency so that vehicles 113 entering road B can be provided with road closure data to know that they cannot continue their journey.

Automatic closure verification and detection methods can suffer from similar inconsistencies. In one embodiment, these methods calculate a closure likelihood for road segments. Continuing with the road structure of the example above, it can be the case where the calculated closure probability or score for road A is above the closure threshold, whereas the closure probability or score for road B is below the closure threshold. In that case, road A is marked closed, and road B is marked open. However, due to the road network, if A is closed, so should B; and conversely, if A is open, so should B. These inconsistencies can result in the system 100 devoting excess and unnecessary storage and/or computing resources to maintain incorrect or poor quality road closure data.

To address these problems, the system 100 introduces a technical solution which adds context to determined road closures (e.g., road closures determined from journalistic reports, automatic closure detection/verification, and/or equivalent processes) using the road network structure (e.g., determined from map data of the geographic database 109 or equivalent) around a road closure and by doing so removes inconsistencies in road closures. In other words, the system 100 evaluates an entire road network or structure around a road closure and resolves any closure inconsistencies. By way of example, inconsistencies occur if one road segment cannot be closed while another road segment is open or vice versa.

In one embodiment, the system 100 determines that a road closure has been either reported journalistically or automatically. In case of journalistic reports, the reported road closure goes through automatic road closure verification system where the system builds a connected roadway network around the closure, referred as roadway graph (e.g., a mathematical graph representing the structure of spatial relationships of road segments or link in the graph) henceforth. The verification, for instance, evaluates vehicle probe data (e.g., vehicle GPS location traces or trajectory data) collected from road segments in the reported closure. The result is a closure likelihood score associated with each road segment and a closure state (closed or open). This score-based closure state can then be used to verify the journalistic report of the road closure.

In the case of automatically detected road closures (as opposed to journalistic reports), again a closure likelihood is calculated per road segment using collected vehicle probe data (e.g., collected from one or more sensors 115a-115k, also collectively referred to as sensors 115, of the vehicles 113). In addition or alternatively, the system 100 can monitor certain select road segments (e.g. those with high closure likelihood) to automatically detect road closures and then confirm the road closures through an automatic verification system according to the embodiments described above.

Whichever path is followed (e.g., journalistic reports or automatic detection of road closures), a roadway graph which comprises a set of road segments with closure likelihood score and potentially another set of roadways without any score can be created. In one embodiment, the roadway graph can be created as part of the processed used to automatically verify and/or detect the road closures; or can be generated in a separated process after road closure detection and verification. In one embodiment, the system 100 processes the roadway graph and the road structure/spatial relationships represented therein to detect inconsistencies in roadway closure states among road segments or links in the graph and resolves them by change the closure states to make them consistent (e.g., by opening or closing roadways in the roadway graph).

Resolution of inconsistencies in road closure data (e.g., stored in the closure data layer 119 of the geographic database 109) using the road network structure or topology around road closures provides several technical advantages. These advantages include but are not limited:

(1) Providing an automatic process that can be accomplished by the system 100 without user intervention to reduce manual resources associated with the inconsistency resolution;

(2) Limiting the search space for resolving inconsistencies to just reported or detected road closures and corresponding map data to reduce computational complexity, time, and resources because resources requirements scale with the number of detected/reported road closures as opposed to all road segments in the world or other designate area of interest;

(3) Simplifying road closure verification and detection mechanisms by enabling inconsistency resolution to be performed as a post-processing step for the detect road closures, thereby reducing computational complexity, time, resources, etc. associated with road closure verification and detection; and (3) Fixing road closure inconsistencies often missed in journalistic reports.

Figure 2:
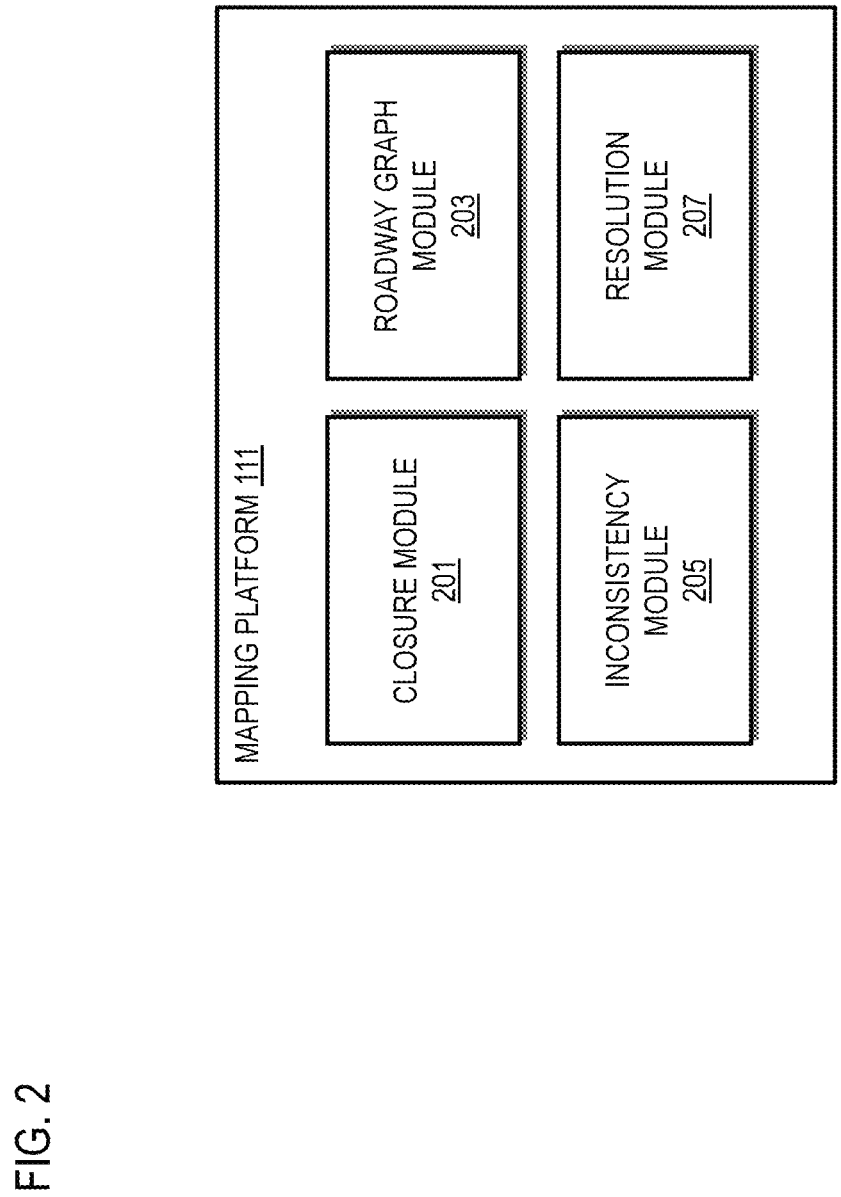
FIG. 2 is a diagram of the components of a mapping platform configured to resolve road closure inconsistencies, according to one embodiment.

In one embodiment, as shown in FIG. 2, the mapping platform 111 of the system 100 includes one or more components for providing road closure graph inconsistency resolution according to the various embodiments described herein. It is contemplated that the functions of these components may be combined or performed by other components of equivalent functionality. As shown, in one embodiment, the mapping platform 111 includes a closure module 201, a roadway graph module 203, an inconsistency module 205, and a resolution module 207. The above presented modules and components of the mapping platform 111 can be implemented in hardware, firmware, software, or a combination thereof. Though depicted as a separate entity in FIG. 1, it is contemplated that the mapping platform 111 may be implemented as a module of any of the components of the system 100 (e.g., a component of the vehicle 113, services platform 103, services 105a-105n (also collectively referred to as services 105), etc.). In another embodiment, one or more of the modules 201-207 may be implemented as a cloud-based service, local service, native application, or combination thereof. The functions of the mapping platform 111 and modules 201-207 are discussed with respect to FIGS. 3-15 below.

Figure 3:
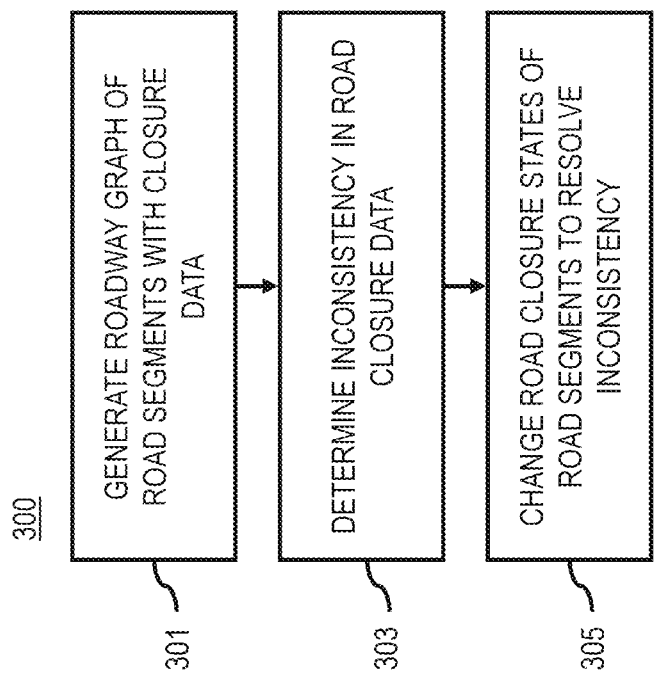
FIG. 3 is a flowchart of a process for automatically resolving road closure inconsistencies, according to one embodiment.
Figure 18:
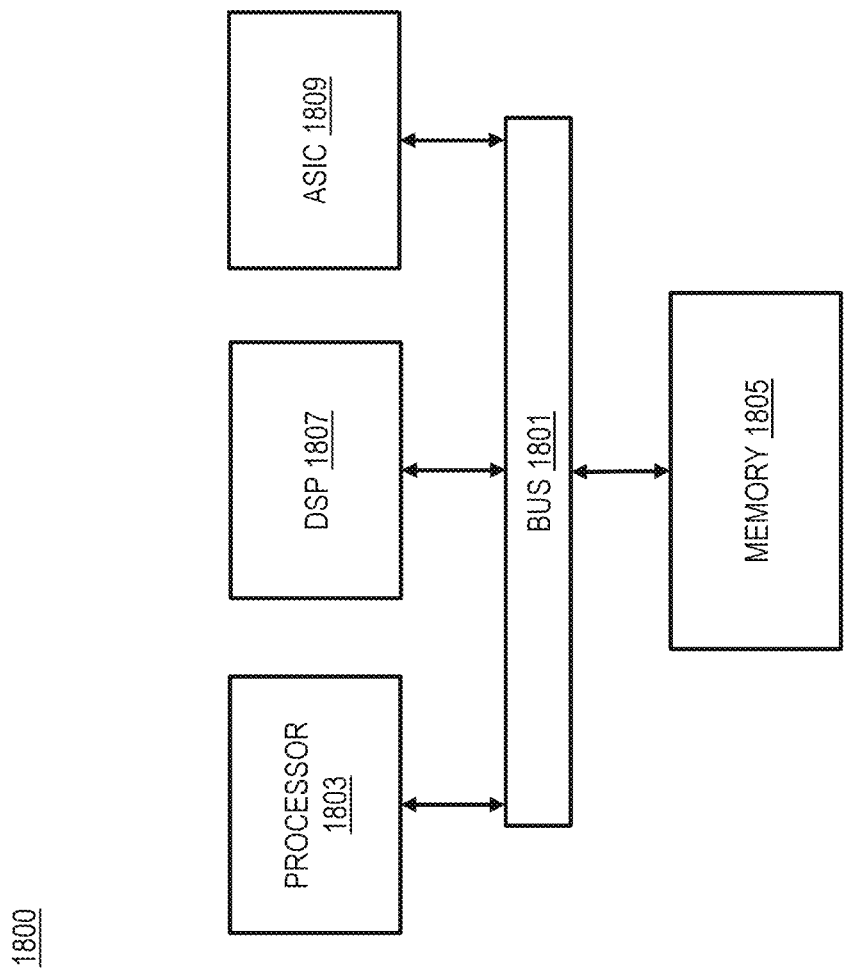
FIG. 18 is a diagram of a chip set that can be used to implement an embodiment.

FIG. 3 is a flowchart of a process for automatically resolving road closure inconsistencies, according to one embodiment. In various embodiments, the mapping platform 111 and/or any of the modules 201-207 may perform one or more portions of the process 300 and may be implemented in, for instance, a chip set including a processor and a memory as shown in FIG. 18. As such, the mapping platform 111 and/or any of the modules 201-207 can provide means for accomplishing various parts of the process 300, as well as means for accomplishing embodiments of other processes described herein in conjunction with other components of the system 100. Although the process 300 is illustrated and described as a sequence of steps, it is contemplated that various embodiments of the process 300 may be performed in any order or combination and need not include all of the illustrated steps.

In one embodiment, the process 300 assumes that a road closure has been reported journalistically or automatically, and/or determined using any equivalent means. The road closure can be stored as one or more road closure reports 101. It is contemplated that the road closure report 101 can be generated and/or transmitted in any data format and includes data indicating a location or roadway affected by a road closure. The data can include a direct indication of the affected link (e.g., by specifying the link IDs corresponding to the roadway or segments affected by the reported road closure), or an indirect indication (e.g., address or offset location that can then be map-matched or translated to corresponding links of the geographic database 109). In some embodiments, the road closure report 101 can optionally include other contextual data such as type of closure, duration of closure, timestamp information, and/or the like. For journalistic reports, the closure module 201 monitor reports received from one or more entities (e.g., government/municipality agencies, police agency, and/or any other third party source of road closure data). For automatic verification and/or detection, the closure module 201 can perform or initiate monitoring of vehicle probe data from road segments of interest to classify or score a likelihood of a closure occurring on the road segments (e.g., based on probe volume, speed, location, heading, etc. meeting thresholds for classifying road segment as open or closed).

In step 301, if a roadway graph has not been generated as part of the road closure verification or detection process, the roadway graph module 203 process map data (e.g., stored in the geographic database 109) to generate a roadway graph representing a spatial relationship between road segments affected by the reported road closure or within a proximity threshold of the reported road closure (e.g., spatial relationship between a first road segment with a reported road closure and then a second road segment flowing into or from the first road segment). In other words, the roadway graph module 203 a roadway graph or closure link graph comprising a connected set of road segments or links including the road links indicated in the road closure report 101 being evaluated. In one embodiment, a road link or segment is the unit representation of a roadway in a digital map such as the geographic database 109. Additional description of a link data record is described below with respect to FIG. 16 below. Generally, a roadway between two consecutive intersections can be represented by one or more links. However, a single link does not span more than the distance between two intersections.

Figure 4:
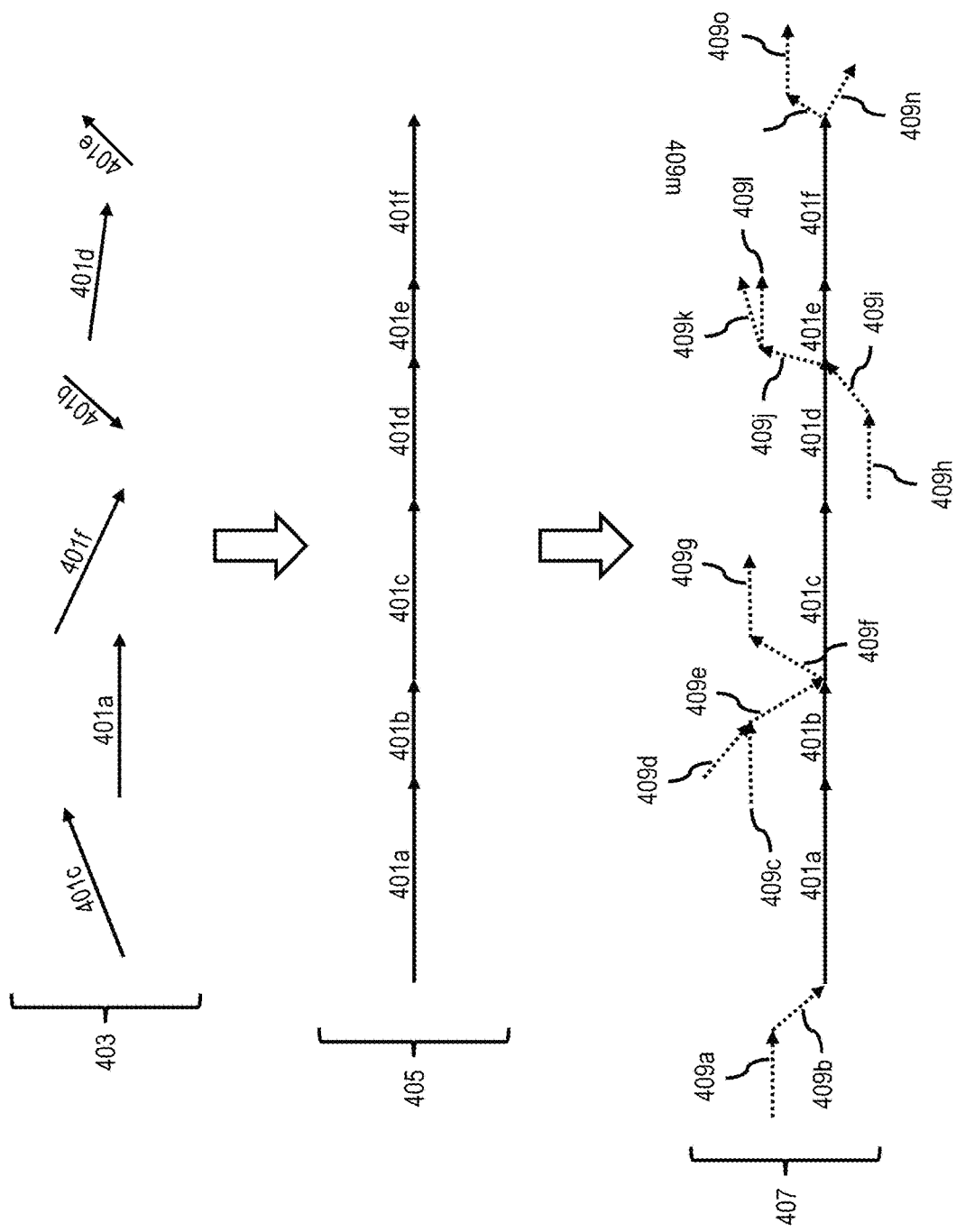
FIG. 4 is a diagram of illustrating an example of constructing a roadway graph, according to one embodiment.

In one embodiment, the closure link graph is used to seal or designate the reported closure area and monitor traffic around and through the closure within the area represented by the closure link graph. As described above, a closure incident is reported on a stretch of roadway (e.g., via a road closure report 101). This closure report 101 is then converted into a set of links. As shown in FIG. 4, these links (e.g., links 401a-401f, also collectively referred to as links 401) can be and unordered set 403 (e.g., unordered with respect to a spatial arrangement).

If the links 401 are unordered, the roadway graph module 203 initiates the building of the closure link graph around these links 401 by ordering the links 401 so that the end of one link is arranged to match the beginning of the next closest link based on the respective locations of their beginning and end nodes. The ordered set 405 of the links 401 is also illustrated in FIG. 4. The ordered set 405 of the links 401 corresponds to the abstract representation of the physical structure road segments making up the roadway indicated in the processed road closure report 101.

Next, the roadway graph module 203 adds links upstream to and downstream from the reported closures to construct the closure link graph 407. Since these links (e.g., links 409a-409o, also collectively referred to as links 409) are not among the original links 401 identified in the processed road closure report 101, the links 409 are assumed to be open and not closed to traffic. The resulting the closure link graph 407 then includes the reportedly closed links 401 buffered by links 409 that are open for travel. In other words, with the addition of open upstream and downstream links 409, the closure (e.g., on links 401) is now isolated. For example, given the closure links 401, all traffic going into and out of the closure region can be monitored using the traffic flowing in the open links 409.

In one embodiment, the flow of traffic is determined by collecting probe data from vehicles. For example, the roadway graph module 203 retrieves probe data collected from vehicles traveling on the roadways corresponding to the closure link graph 407. In one embodiment, probe data includes raw GPS probes (e.g., probe points) sent from vehicles indicating their respective locations by, for instance, a latitude and longitude pair. Then, each probe point is placed onto a most probable link on the map using a map matching process. On example map-matching process works as described in the following section. A map is defined by a set of links and their geographic coordinates. Because GPS (or other similar location positioning technology) is not 100% accurate, the coordinates of a vehicle GPS probe most of the time do not fall onto a link perfectly. To account for this error, map matching algorithms take the coordinate of a GPS probe, and find the neighboring links whose coordinates are close to the probe. Then, the map matching process places the vehicle probe onto the most probable link based on pre-defined criteria of the specific map matching process or algorithm being used.

In one embodiment, to better control for map matching error, the roadway graph module 203 described herein works with vehicle paths instead of map matched vehicle probes. The reason is that map matched vehicle probes can be more are susceptible to map matching errors than vehicle paths. By way of example, a vehicle path or trajectory is derived from two consecutive map matched vehicle probes. The path can then be increased by adding new probe points on top of the previously calculated vehicle path as new probe points are collected.

In one embodiment, the roadway graph module 203 can process the probe data to calculate vehicle paths traversing the monitored closure link graph 407 according to the example process described below. Firstly, for a specific vehicle, the roadway graph module 203 takes the first and second probe points received, e.g., denoted as probe1 and probe2. If the time difference between these probes is more than a specified threshold, the roadway graph module 203 discards the initial probe1, and the sets probe1=probe2. The roadway graph module 203 then retrieves the next probe point to set as probe 2 to iteratively evaluate the time difference.

If the time difference is less than the specified threshold, the roadway graph module 203 builds a vehicle path from probe1 to probe2. It is contemplated that the roadway graph module 203 can use any path building process or algorithm such as but not limited to A* pathfinding or equivalent. The roadway graph module 203 then records the new path for the vehicle, discards probe1, sets probe1=probe2, and retrieves the next probe point to act as probe2 until all probe points collected for the specific vehicle have been processed.

In one embodiment, every vehicle can send its probe points (e.g., GPS probes) at a different frequency; this frequency can vary from 1 second to a few minutes. Therefore, as a vehicle drives through multiple links, there is no guarantee that it will send a probe from every link. For instance, if a vehicle drives at fast speeds over short links while sending a probe every 2 minutes, it would almost be certain that its two consecutive probes will arrive from non-neighboring links. This sporadic or sparse probe reporting can make it more technically challenging to build accurate vehicle paths.

To address this technical challenge, in one embodiment, as part of its link graph building process, the roadway graph module 203 can aggregate links and their probes where it makes sense into superlinks. In one embodiment, a superlink consists of ordered links such that if a vehicle travels through one of its links, it is guaranteed to travel through the other links of the same superlink as well. An example of a superlink is a section of a highway stretching between two entrance/exit ramps. When on this stretch a vehicle must go through all the links part when driving this stretch. Another example is a roadway between two intersections in a city road. Because a superlink comprises one or more links, superlinks are often longer than normal links of the geographic database 109, thereby increasing the probability that a probe point of a vehicle path would fall on the superlink than on a normal link. In addition, the superlinks can decrease the overall complexity of the closure link graph 407 without affecting the quality of the closure evaluation results, thereby reducing computing resources (e.g., processing resources, memory resources, bandwidth resources, etc.) associated with automatic evaluation of road closure reports according to the various embodiments described herein.

Figure 5:
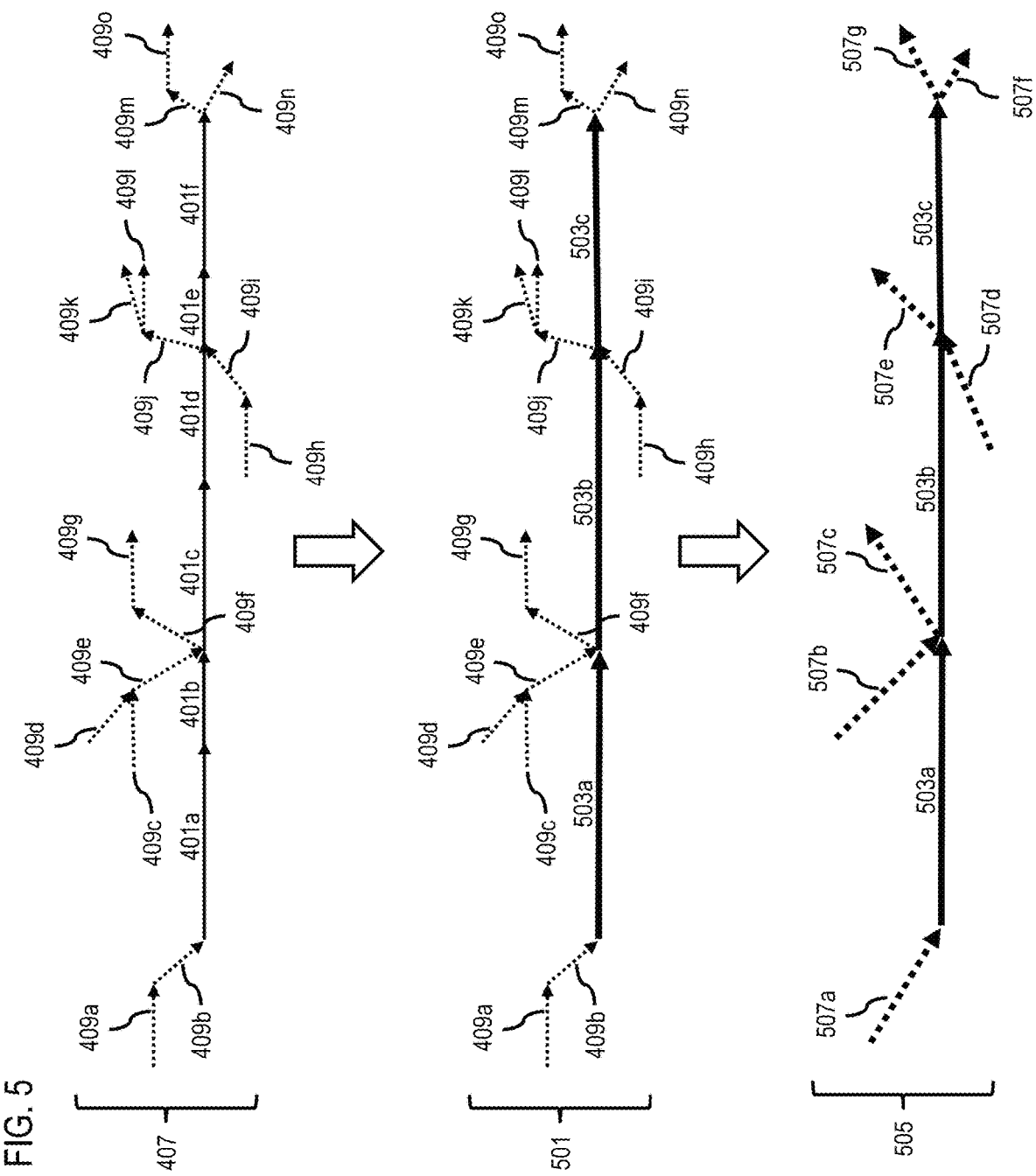
FIG. 5 is diagram of aggregating road links of a roadway graph into superlinks, according to one embodiment.

FIG. 5 is diagram of an example of aggregating road links of the closure link graph 407 into superlinks, according to one embodiment. FIG. 5 continues the example closure link graph 407 of FIG. 5 and illustrates a first superlink graph 501 that is a version of the closure link graph 407 in which the reportedly closed links 401 are aggregated into respective superlinks. In this example, links 401*a* and 401*b* can form a superlink 503*a* because a vehicle on link 401*a* must also travel through link 401*b*. Similarly, links 401*c* and 401*d* can be aggregated as superlink 503*b*, and links 401*e* and 401*f* can be aggregated into superlink 503*c*.

In one embodiment, the upstream and downstream links 409 can be aggregated into superlinks in addition to the links 401 to construct superlink graph 505. For example, links 409*a* and 409*b* can be aggregated into superlink 507*a*, links 409*c*-409*e* can be aggregated into superlink 507*b*, links 409*f* and 409*g* can be aggregated into superlink 507*c*, links 409*h* and 409*i* can be aggregated into superlink 507*d*, links 409*j*-409*l* can be aggregated into superlink 507*e*, and links 409*m* and 409*o* can be aggregated into superlink 507*g*. Referring for instance to the example of FIGS. 4 and 5, if a vehicle has probe points on link 401*a*, 401*c*, and 401*f*, the roadway graph module 203 can calculate the vehicle path to include links all links 401*a*-401*f* based on the superlinks 503*a*-503*c*. In one embodiment, links and superlinks can be used interchangeably in the various embodiments described herein. Therefore, where links are described without reference superlinks, it is contemplated that superlinks can be used in addition to or as alternate to links, and vice versa.

Returning to step 303 of the process 300 of FIG. 3, the inconsistency module 205 can determine inconsistencies in road closure data associated with the roadway graph (e.g., as constructed above in step 301). In one embodiment, a road closure inconsistency means that in a connected roadway graph, two or more links (e.g., representing a first road segment and a second road segment) cannot co-exist with the given closure status or state. In other words, the roadway indicates a spatial relationship between at least two road segments where that a first closure state of the first road segment cannot differ from a second closure state of the second road segment (e.g., road segment A cannot have "open" state while roadway B is in "closed" state, or vice versa).

Several road closure inconsistencies can arise in a connected roadway graph depending on the underlying structure or spatial relationship of the road segments in the graph. Examples of these inconsistencies are discussed with respect to a road structure 601 (also referred to as Structure 1) of FIG. 6 and a road structure 701 (also referred to as Structure 2) of FIG. 7. In the example of FIG. 6, Structure 1 (e.g., road structure 601) of the roadway graph illustrates a structure in which a set of superlinks flow into only one superlink (e.g., Link X). Accordingly, assuming that Link X is the first road segment of interest, there would be one or more second road segments that are incoming road segments that flow into the first road segment. In the example of FIG. 7, Structure 2 (e.g., road structure 701) of the roadway graph illustrates a structure in which a set of superlinks have only one source superlink (e.g., Link X) flowing into them. Accordingly in this example, assuming that Link X is the first road segment of interest, there would be one or more second road segments that are outgoing road segments that flow from the first road segment.

In one embodiment, given the Structure 1 and Structure 2, the following closure state inconsistencies can arise in roadway or closure graphs containing one or more of the structures:

(1) Inconsistency 1—In Structure 1, if Link X is closed and one or more of the incoming superlinks are open, the traffic on open incoming superlinks cannot flow anywhere. Therefore, either Link X must be open, or all incoming superlinks must be closed.

(2) Inconsistency 2—In Structure 1, if Link X is open and all of the incoming superlinks are closed, no traffic can flow into Link X. Therefore, either Link X must be closed or at least one of the incoming superlinks must be open.

(3) Inconsistency 3—In Structure 2, if Link X is closed, and one or more of the outgoing superlinks are open, no traffic can flow into these outgoing superlinks, as their sole source of traffic, Link X, is closed. Therefore, either Link X is open, or all of the outgoing superlinks are closed.

(4) Inconsistency 4—In Structure 2, if Link X is open, and all of the outgoing superlinks are closed, traffic on Link X cannot flow anywhere. Therefore, either Link X is closed, or at least one of the outgoing superlinks is open.

In one embodiment, to detect one or more of the inconsistencies described above in a roadway graph of interest, the inconsistency module 205 searches the graph for road topologies that match Structure 1 and/or Structure 2. The inconsistency module 205 can then determine the closure states of the road segments comprising the detected structures to identify one or more of the inconsistencies described above. For example, to detect Inconsistency 1, the inconsistency module 205 processes the roadway graph to determine that: (1) the roadway graph indicates that the second road segment is an incoming road segment that flows into the first road segment; (2) the road closure state of the first road segment is closed; and (4) the road closure state of the second road segment is open. To detect Inconsistency 2, the inconsistency module 205 processes the roadway graph to determine that: (1) the roadway graph indicates that the second road segment is an incoming road segment that flows into the first road segment; (2) the road closure state of the first road segment is open; (3) the road closure state of the second road segment is closed, and (4) all other incoming road segments (if any) flowing into the first road segment are closed. To detect Inconsistency 3, the inconsistency module 205 processes the roadway graph to determine that: (1) the roadway graph indicates that the second road segment is an outgoing road segment that flows from the first road segment; (2) the road closure state of the first road segment is closed; and (4) the road closure state of the second road segment is open. To detect Inconsistency 4, the inconsistency module 205 processes the roadway graph to determine that: (1) the roadway graph indicates that the second road segment is an outgoing road segment that flows from the first road segment; (2) the road closure state of the first road segment is open; (3) the road closure state of the second road segment is closed, and (4) all other outgoing road segments (if any) flowing from the first road segment are closed.

Returning to step 305 of the process 300 of FIG. 3, the resolution module 207 can then change the road closure data stored in the mapping platform 111 (e.g., in the closure data layer 119 of the geographic database 109) to resolve the inconsistency. For example, the resolution module 207 can either match the road closure state of the first road segment being evaluated with the road closure state of the second road segment, or match the road closure state of the second road segment with the closure state of the first road segment. In one embodiment, the resolution module 207 selects between matching the first road closure state with the second road closure state or matching the second road closure state with the first road closure state based on closure score data calculated for the first road segment, the second road segment, or a combination thereof.

In other words, the resolution module 207 can remove any detected inconsistencies by post-processing a closure graph to mark superlinks as closed or open, where it makes sense as described above. In one embodiment, some of the superlinks have been evaluated by an automated verification algorithm and have a closure likelihood score. These superlinks are denoted as "evaluated" superlinks ("E" links). Depending on the closure graph structure, these superlinks are also called either "incoming" ("I" links) or "outgoing" ("O" links). Other superlinks, which have not been evaluated (hence do not have a closure likelihood score), are called only "incoming" ("I" links) or "outgoing" ("O" links) superlinks, depending on the closure graph structure.

In one embodiment, the resolution module 207 can use any means to calculate a road closure probability or score. For example, in a road closure verification or detection process, the road closure score can calculated based features derived from the probe data (e.g., GPS probe data) collected from the vehicles traveling on the connected set of road links of the roadway or closure link graph. As described above, the roadway graph includes the road link indicated in a road closure report that is be verified or detected as well as one or more upstream and/or downstream links. In one embodiment, the features can include any characteristic, property, and/or attribute associated with the probe vehicles, road links on which the travel, and/or other related contextual attributes (e.g., time, location, spatial relationship between links, etc.) that can be determined based on the probe data of the roadway graph. Examples of calculating such features are discussed in more detail below.

One example of a feature relates to "through vehicles" associated with the road links of the roadway graph. This feature, for instance, is the total number of vehicles which passed through a given link or superlink of the roadway graph in a given time epoch; e.g. every 5 minutes. In one embodiment, the resolution module 207 can calculate the through vehicles feature as follows:

1. For the monitored set of links of the roadway graph of interest, collect all vehicle probes (e.g., GPS probe points) within the specified time epoch or interval.
2. Group the collected probes by unique vehicle ID.
3. For each vehicle (e.g., as identified by the unique vehicle ID):
    3.1 Determine the vehicle's path either:
        3.1.1 Using a path-based mapmatcher to process the probe data for each vehicle; or
        3.1.2 Using a point-based mapmatcher combined with extra logic to correct mapmatching errors to process the probe data for each vehicle.
4. For all the links and/or superlinks included in the vehicle's path, increment the feature's value (e.g., increment by 1) to determine the total number of through vehicles passing through a road link in a given time epoch.

It is noted that this feature is different than GPS probe count on a link or superlink. For example, in contrast to a probe count, a probe that is mis-mapmatched onto the link or superlink is not counted in this feature because the erroneous map-matching would be corrected by the path-based mapmatcher or the extra error correcting logic used in combination with the point-based mapmatching. By similar logic, a vehicle which has no GPS probes on a specific link or superlink would still be counted in this feature if its driving path passes through the link or superlink.

In one embodiment, the resolution module 207 can also calculate an "expected through vehicles" feature, which can then be compared against the through vehicles feature calculated above to evaluate the closure probability or score of a road link of interest. The expected through vehicle feature, for instance, is the total number of vehicles expected to pass through a link or superlink for a given epoch (e.g. 5 minutes) so that the evaluation of the through vehicles feature to the expected through vehicles feature can be performed for each given time epoch. In one embodiment, the expected through vehicles feature is the summary statistics of the number of through vehicles for that specific time epoch over a historical period (e.g., the same time epoch over a number of days). There are different possibilities to calculate this value, such as but not limited to the following (note that as an example, it is assumed an epoch corresponds to 5-minutes, and there are 100 days-worth of historical data):

1. Over all epochs in a day, over all days, calculate average through vehicle value. There are 288 5-minute epochs per day. This embodiment of the feature averages all 288×100 through vehicle feature values.
2. Over all days, calculate an average through vehicle value for every specific 5-minute epoch in a day. Hence, there will be one value for the interval 00:00-00:05, another one for 00:05-00:10, . . . 23:55-00:00.
3. Calculate the same average as in item 2 above. In one embodiment, this can calculation can be stratified by time to capture differences in values between types of days (e.g., weekends versus weekdays). In this case, the expected through vehicles feature can be calculated twice; once for weekends, once for weekdays.
4. Calculate the same average as in item 2 above for each weekday, Monday through Sunday, to capture difference in values between individual days. Time stratifications other than days can also be used including but not limited to months, seasons, day versus night, etc.
5. Any approach from among items 1 to 4 above; but replace average with median or other equivalent statistic.

In one embodiment, the resolution module 207 can also calculate a detouring vehicles feature. A very strong indicator of a closure are vehicles detouring or avoiding a given road segment. This feature calculates number of vehicles detouring around or avoiding a given link or superlink. For example, the detouring vehicles feature can be particularly suited for highways and highway like roads with exit/entry ramps or other entry/exit options to bypass a given road segment or link. In one embodiment, a vehicle is classified as detouring a certain link or superlink if the vehicle is on its way to the evaluated link/superlink, but changes its route away from that link/superlink, drives nearby and re-joins the road which is an extension or continuation of the evaluated link/superlink.

Another set of features for calculating a closure score or probability are based on vehicle speeds. For example, non-zero values for through vehicles feature are an indication of vehicle presence on the road. Yet these vehicles can be construction vehicles doing work on a closed road or emergency vehicles operating at an accident site which is closed to traffic. Therefore, under some scenarios, the through vehicles feature can be misleading on its own. To address this issue, the resolution module 207 can calculate a vehicle speed feature (e.g., representing speeds of the probes in the closure link graph). For example, construction vehicles or emergency vehicles operating at a closure site usually have either zero speed values or close to zero speed values. In on embodiment, the feature module 205 can use the vehicle speed feature to:

remove the vehicles from the through vehicles feature (in case of close-to-zero speeds);
mark these vehicles as construction/emergency vehicles (in case of close-to-zero speeds); and/or
open the road in case of high speeds.

It is contemplated that the vehicle speed feature can be any characteristic, attribute, property, etc. that is indicative of the speed of a vehicles traveling in the road network of the closure link graph including but not limited to:
mean vehicle speed;
median vehicle speed (in case of an outlier vehicle with a very high or miscalculated speed; and/or
number/percent of vehicles with less than a small speed threshold. An example could be: there are 5 vehicles with speeds 2 kph, 3 kph, 5 kph, 20 kph and 50 kph. Small speed threshold is 10 kph. Then the feature would be 3/5=60%.

In one embodiment, another feature can be a Closure Report Source Confidence. Incident sources which report closures do not necessarily have the same quality. Some of them are very accurate, whereas others are less. The resolution module 207 can take advantage of this information. For example, based on previous performance, incident sources can be assigned a confidence value; the higher the confidence value, the more trusted a source is. In one embodiment, this information could then be used for ambiguous cases; e.g., in the middle of the night a reported superlink which expects to see 1.5 vehicles on average has only one vehicle going through it. In other words, source confidence could be used to decide whether to trust the source or to discard it when verifying road closures or calculating road closure scores.

In one embodiment, temporal features can also be considered. Generally, all of the features described above are calculated for the current epoch (e.g., over probes received in the past 5 minutes). However, acting on information received only in the current epoch can be prone for errors. For example, if the epoch is short (e.g., 5 minutes), then resulting decisions can be to reactive to noise: the resolution module 207 will act on any small change that affects the dynamics of the road network for a few minutes. On the other hand, if the epoch is too long (e.g., 1 hour), the algorithm will not react fast to a closure. In one embodiment, to overcome this dilemma, the resolution module 207 can calculate the above-mentioned features for a small epoch (e.g., epoch below a time duration threshold such as 5 minutes) as well as for a long epoch (e.g., epoch above a time duration threshold such as 1 hour). The features determined for both the short and long epochs can then be used alone or in combination to calculate closure score or probability. After calculating the features derived from probe data of roadway graph being monitored or evaluated, the resolution module 207 can calculate the closure probability score of the road link of interest based on the calculated features.

Figure 8:
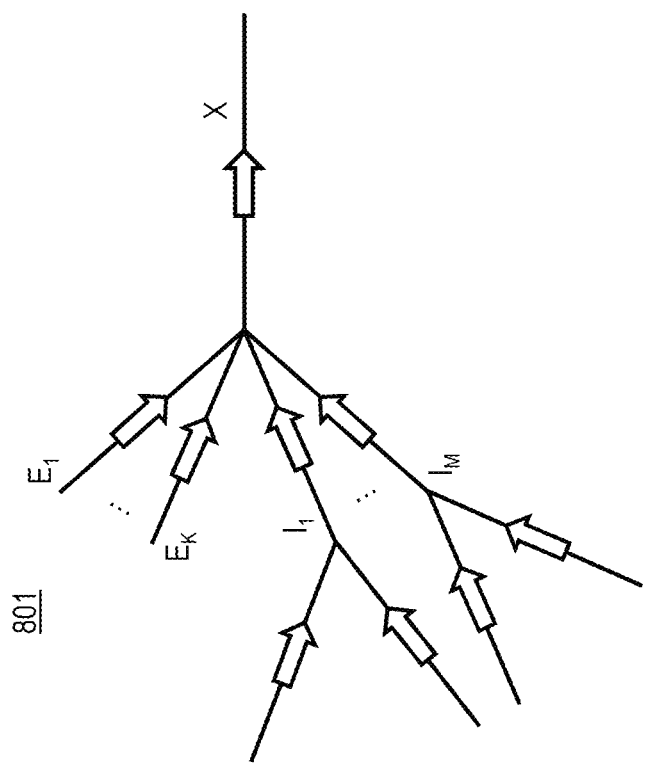

As discussed above, in one embodiment, road segments of the roadway graph can then be classified based on whether they have been evaluated (e.g., have a calculated closure probability or score). Links that have a calculated road closure score can be labeled (e.g., labeled as Link E) to differentiate from links that have not been evaluated (e.g., labeled as either Link I for incoming links or Link O for outgoing links). FIG. 8 illustrates an example of a Structure 1 type structure 801 (e.g., multiple superlinks flow into only one upstream superlink) that has been labeled to indicate graph conditions as follows:

1. There is an evaluated superlink X which has one or more incoming superlinks. In the most general case, there exist two types of incoming superlinks:
    a. K Incoming superlinks, $E_k$, which are also evaluated.
    b. M Incoming superlinks, $I_m$, which are not evaluated. Note that $I_m$ superlinks can be extended as long as the extended superlink flows only into $I_m$ superlinks and no other link. This is depicted in FIG. 8, where two superlinks make a merge and join $I_l$ ($I_M$ has a similar structure as well). In one embodiment, because $I_m$ superlinks are not evaluated (they do not have a closure likelihood score), they are assumed to be open by default.

2. Superlink X is the only upstream superlink for all of $E_k$ and $I_m$.

3. Superlink X has been evaluated and has a closure likelihood score.

In one embodiment, when processing the roadway graphs exhibiting the example structure 801, the resolution module 207 selects between matching the road closure state of a first road segment with the road closure state of second and matching the road closure state of the second road segment with the road closure state of the first road segment based calculating a sum of respective closure scores for the second road segment flowing into the first road segment and all other incoming road segments.

Figure 9:
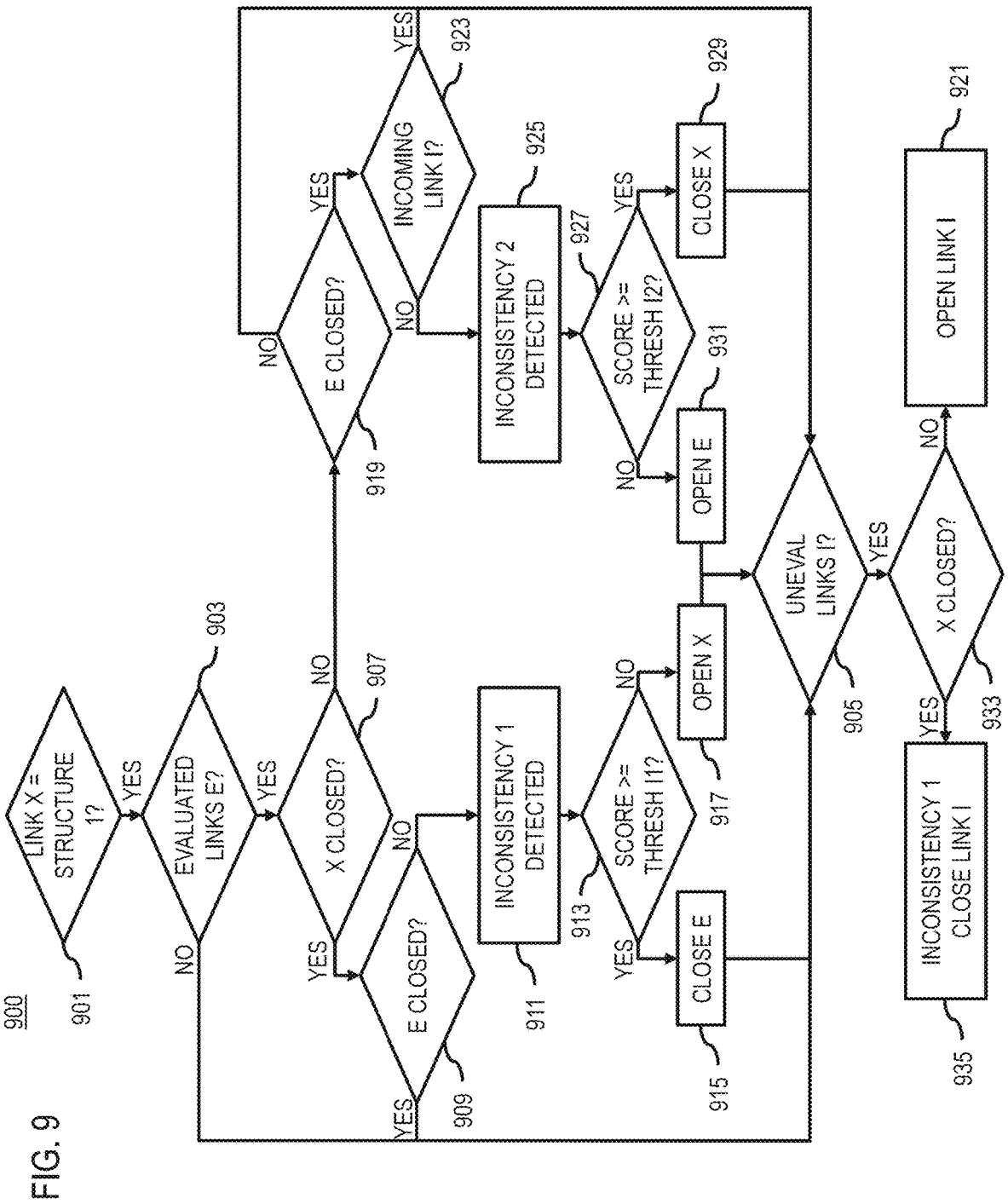
FIG. 9 is a flowchart of a process of resolving road closure inconsistencies in a roadway graph exhibiting a first structure, according to one embodiment.

FIG. 9 illustrates a flowchart of an example process for resolving inconsistencies for roadway graphs exhibiting the structure 801 of FIG. 8, according to one embodiment. In various embodiments, the mapping platform 111 and/or any of the modules 201-207 may perform one or more portions of the process 900 and may be implemented in, for instance, a chip set including a processor and a memory as shown in FIG. 18. As such, the mapping platform 111 and/or any of the modules 201-207 can provide means for accomplishing various parts of the process 900, as well as means for accomplishing embodiments of other processes described herein in conjunction with other components of the system 100. Although the process 900 is illustrated and described as a sequence of steps, it is contemplated that various embodiments of the process 900 may be performed in any order or combination and need not include all of the illustrated steps.

In step 901, the resolution module 207 checks if there are any superlinks X which fulfill the superlink graph conditions described above with respect to FIG. 8. If yes, the resolution module 207 proceeds to step 903. If there are multiple superlinks X in the roadway graph that meet the conditions for structure 801 of FIG. 8 (Structure 1 type), each superlink X can be evaluated separately through the process 900. Otherwise, the resolution module 207, takes no further action.

In step 903, the resolution module 207 checks if superlink X has any evaluated incoming superlinks, $E_k$. In other words, the resolution module 207 checks whether any of the incoming superlinks has a recorded or stored road closure probability or score. If not, the resolution module 207 proceeds to step 905 to check unevaluated incoming links.

If yes, the resolution module 207 checks whether the closure state of superlink X is closed (step 907), and then checks whether the closures states of all evaluated incoming links $E_k$ are closed (step 909). IF both closure states of superlink X and all evaluated incoming links $E_k$ are closed, the resolution module 207 proceeds to step 905 to check unevaluated incoming links.

If superlink X is closed, but one or more of the evaluated incoming links $E_k$ are open, the resolution module 207 determines that an Inconsistency 1 has been detected (step 911). Based on the detection of Inconsistency 1, the resolution module 207 performs the following:

Calculate sum of (closure score of superlink X) and (average closure score for evaluated incoming links $E_k$) as follows:

score_sum=score$X$+mean(score$Ek$).

Compare the sum against a threshold (step 913). By way of example, the threshold can be set based on ground truth observations or data of known closure states and their respective scores. In one embodiment, thresholds can be determined separately for each type of inconsistency.

If score_sum>=threshold I1, the resolution module 207 sets the closure state to closed for all evaluated incoming links $E_k$ (step 915).

Otherwise, the resolution module 207 sets the closure state of the superlink X to open (step 917).

The resolution module 207 then proceeds to step 905 to check unevaluated incoming links.

If the resolution module 207 determines that superlink X is open at step 907, and that one or more evaluated incoming links $E_k$ are open at step 919, the resolution module 207 proceeds to step 921 to change the state of incoming links $I_m$ to open.

If the resolution module 207 determines that superlink X is open at step 907, all evaluated incoming links $E_k$ are closed at step 919, and there is at least one $I_m$ superlink at step 923, the resolution module 207 proceeds to step 921 to change the state of unevaluated incoming superlinks $I_m$ to open.

If the resolution module 207 determines that superlink X is open at step 907, all evaluated incoming links $E_k$ are closed at step 919, and there are no $I_m$ superlinks at 923, then the resolution module 207 determines that an Inconsistency 2 has been detected (step 925). Based on the detection of Inconsistency 2, the resolution module 207 performs the following:

Calculate sum of (closure score of superlink X) and (average closure score for evaluated incoming links $E_k$) as follows:

score_sum=score$X$+mean(score$Ek$).

Compare the sum against a threshold (step 927). By way of example, the threshold can be set based on ground truth observations or data of known closure states and their respective scores. In one embodiment, thresholds can be determined separately for each type of inconsistency.

If score_sum>=threshold I2, the resolution module 207 sets the closure state to closed for superlink X (step 929).

Otherwise, the resolution module 207 sets the closure state to open for all evaluated incoming links $E_k$ (step 931).

The resolution module 207 then proceeds to step 905 to check unevaluated incoming links.

At step 905, the resolution module 207 checks if superlink X has any unevaluated incoming superlinks, L. If not, the resolution module 207 terminates and takes no further action. If yes, the resolution module 207 checks whether superlink X is closed at step 933. If superlink X is closed, the resolution module 207 determines that an Inconsistency 1 has been detected and then sets the closure states of all unevaluated incoming superlinks $I_m$ to closed (step 935). If superlink X is open, the resolution module sets the closure states of all unevaluated incoming superlinks $I_m$ to open (step 921).

Figure 10:
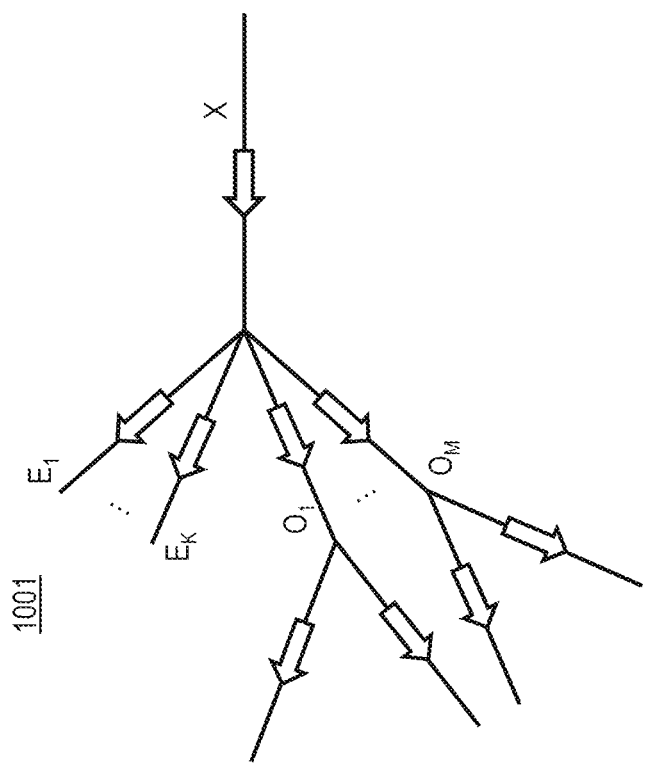
FIG. 10 is a diagram of an example second roadway structure, according to one embodiment.

In one embodiment, similar resolution processes can be performed for other structures detected in the roadway graph. For example, FIG. 10 illustrates an example of a Structure 2 type structure 1001 (e.g., multiple superlinks follow into only one upstream superlink) that has been labeled to indicate graph conditions as follows:

1. There is an evaluated superlink X which has one or more incoming superlinks. In the most general case, there exist two types of incoming superlinks:

a. K Outgoing superlinks, $E_k$, which are also evaluated.
b. M Outgoing superlinks, $O_m$, which are not evaluated. Note that $O_m$ superlinks can be extended as long as the extended superlink flows only into $O_m$ superlinks and no other link. This is depicted in FIG. 10, where two superlinks make a merge and join $O_J$ ($O_M$ has a similar structure as well). In one embodiment, because $O_m$ superlinks are not evaluated (they do not have a closure likelihood score), they are assumed to be open by default.

2. Superlink X is the only downstream superlink for all of $E_k$ and $O_M$.
3. Superlink X has been evaluated and has a closure likelihood score.

In one embodiment, when processing the roadway graphs exhibiting the example structure 1001, the resolution module 207 selects between matching the road closure state of a first road segment with the road closure state of second and matching the road closure state of the second road segment with the road closure state of the first road segment based on calculating a sum of respective closure scores for the second road segment flowing into the first road segment and all other incoming road segments.

Figure 11:
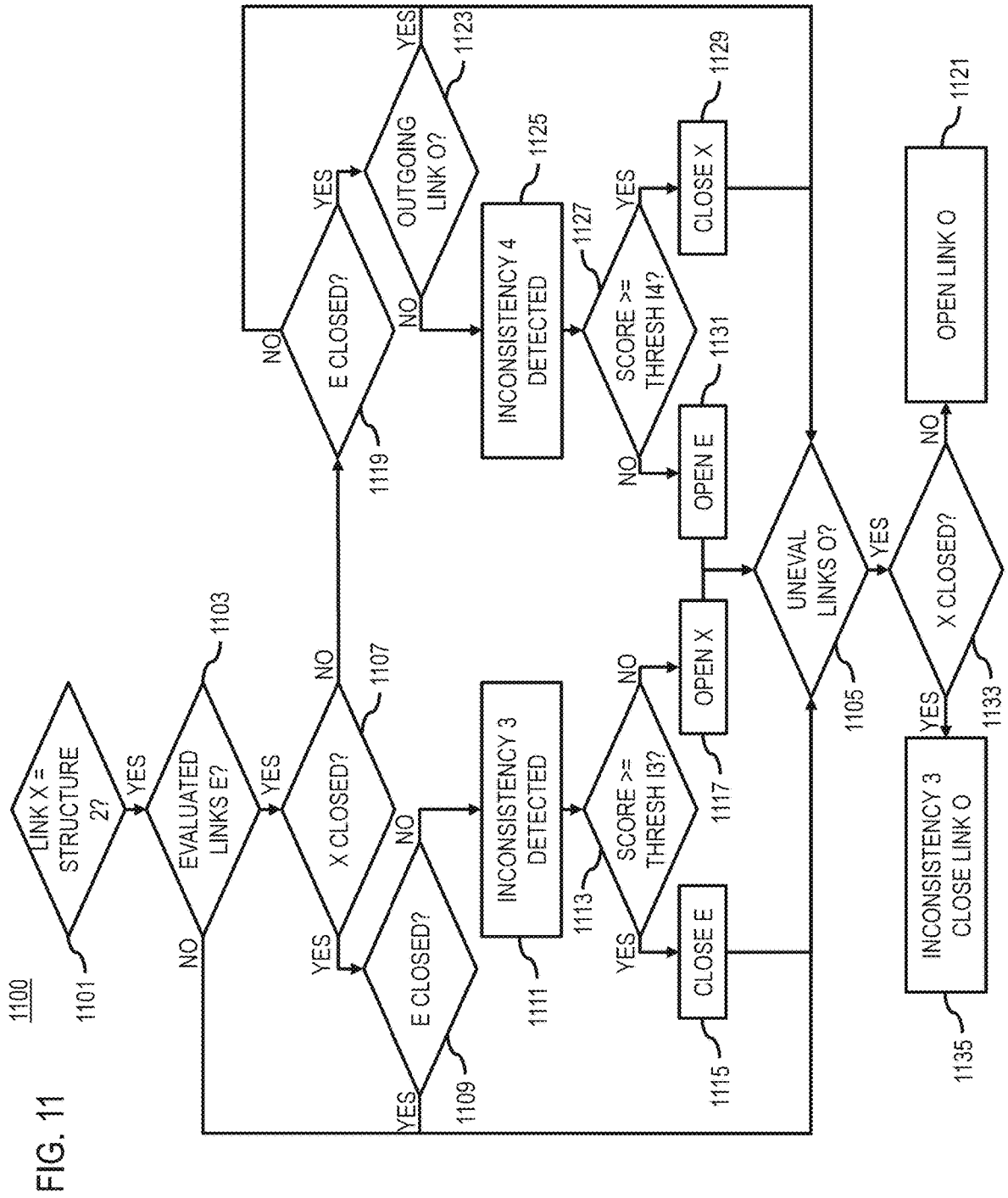
FIG. 11 is a flowchart of a process of resolving road closure inconsistencies in a roadway graph exhibiting a second structure, according to one embodiment.

FIG. 11 illustrates a flowchart of an example process for resolving inconsistencies for roadway graphs exhibiting the structure 1001 of FIG. 10, according to one embodiment. In various embodiments, the mapping platform 111 and/or any of the modules 201-207 may perform one or more portions of the process 1100 and may be implemented in, for instance, a chip set including a processor and a memory as shown in FIG. 18. As such, the mapping platform 111 and/or any of the modules 201-207 can provide means for accomplishing various parts of the process 1100, as well as means for accomplishing embodiments of other processes described herein in conjunction with other components of the system 100. Although the process 1100 is illustrated and described as a sequence of steps, it is contemplated that various embodiments of the process 1100 may be performed in any order or combination and need not include all of the illustrated steps.

In step 1101, the resolution module 207 checks if there are any superlinks X which fulfill the superlink graph conditions described above with respect to FIG. 10. If yes, the resolution module 207 proceeds to step 1103. If there are multiple superlinks X in the roadway graph that meet the conditions for structure 1001 of FIG. 10 (Structure 2 type), each superlink X can be evaluated separately through the process 1100. Otherwise, the resolution module 207, takes no further action.

In step 1103, the resolution module 207 checks if superlink X has any evaluated outgoing superlinks, $E_k$. In other words, the resolution module 207 checks whether any of the outgoing superlinks has a recorded or stored road closure probability or score. If not, the resolution module 207 proceeds to step 1105 to check unevaluated outgoing links.

If yes, the resolution module 207 checks whether the closure state of superlink X is closed (step 1107), and then checks whether the closures states of all evaluated outgoing links $E_k$ are closed (step 1109). IF both closure states of superlink X and all evaluated outgoing links $E_k$ are closed, the resolution module 207 proceeds to step 1105 to check unevaluated outgoing links.

If superlink X is closed, but one or more of the evaluated outgoing links $E_k$ are open, the resolution module 207 determines that an Inconsistency 3 has been detected (step 1111). Based on the detection of Inconsistency 3, the resolution module 207 performs the following:

Calculate sum of (closure score of superlink X) and (average closure score for evaluated outgoing links $E_k$) as follows:

score_sum=score$X$+mean(score$Ek$).

Compare the sum against a threshold (step 1113). By way of example, the threshold can be set based on ground truth observations or data of known closure states and their respective scores. In one embodiment, thresholds can be determined separately for each type of inconsistency.

If score_sum>=threshold 13, the resolution module 207 sets the closure state to closed for all evaluated outgoing links $E_k$ (step 1115).

Otherwise, the resolution module 207 sets the closure state of the superlink X to open (step 1117).

The resolution module 207 then proceeds to step 1105 to check unevaluated outgoing links.

If the resolution module 207 determines that superlink X is open at step 1107, and that one or more evaluated outgoing links $E_k$ are open at step 1119, the resolution module 207 proceeds to step 1121 to change the state of outgoing links $O_m$ to open.

If the resolution module 1107 determines that superlink X is open at step 1107, all evaluated outgoing links $E_k$ are closed at step 1119, and there is at least one $O_m$ superlink at step 1123, the resolution module 207 proceeds to step 1121 to change the state of unevaluated outgoing superlinks $O_m$ to open.

If the resolution module 207 determines that superlink X is open at step 1107, all evaluated outgoing links $E_k$ are closed at step 1119, and there are no $O_m$ superlinks at 1123, then the resolution module 207 determines that an Inconsistency 4 has been detected (step 1125). Based on the detection of Inconsistency 4, the resolution module 207 performs the following:

Calculate sum of (closure score of superlink X) and (average closure score for evaluated outgoing links $E_k$) as follows:

score_sum=score$X$+mean(score$Ek$).

Compare the sum against a threshold (step 1127). By way of example, the threshold can be set based on ground truth observations or data of known closure states and their respective scores. In one embodiment, thresholds can be determined separately for each type of inconsistency.

If score_sum>=threshold 14, the resolution module 207 sets the closure state to closed for superlink X (step 1129).

Otherwise, the resolution module 207 sets the closure state to open for all evaluated outgoing links $E_k$ (step 1131).

The resolution module 207 then proceeds to step 1105 to check unevaluated incoming links.

At step 1105, the resolution module 207 checks if superlink X has any unevaluated outgoing superlinks, $O_m$. If not, the resolution module 207 terminates and takes no further action. If yes, the resolution module 207 checks whether superlink X is closed at step 1133. If superlink X is closed, the resolution module 207 determines that an Inconsistency 3 has been detected and then sets the closure states of all unevaluated outgoing superlinks $O_m$ to closed (step 1135). If superlink X is open, the resolution module 207 sets the closure states of all unevaluated outgoing superlinks $O_m$ to open (step 1121).

Figure 12:
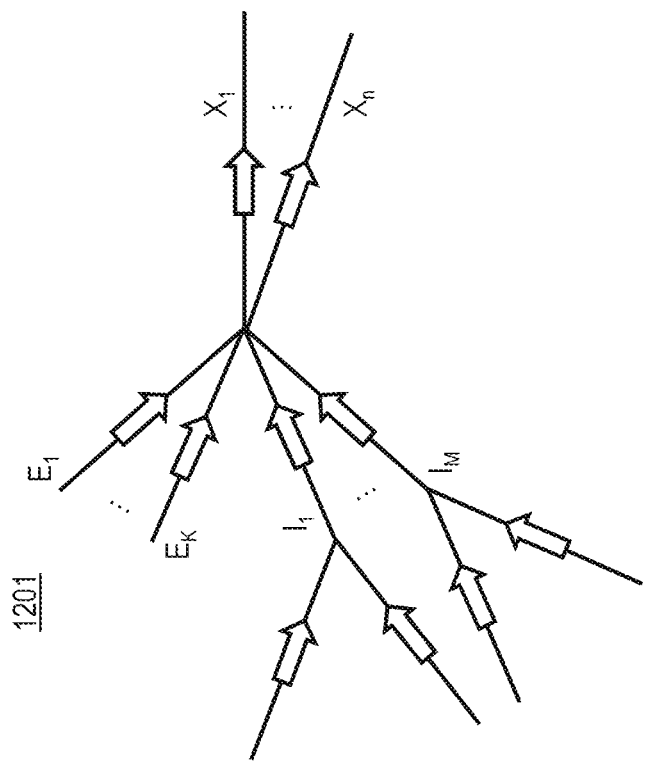
FIG. 12 is a diagram of an example first generalized roadway structure, according to one embodiment.

In the examples of FIG. 8 and FIG. 10, the evaluated structures include only on superlink X connected at a node either with one or more incoming links or with one or more outgoing links. However, the embodiments described herein are also applicable to more complex road network structures that include multiple superlinks X connected at the node with multiple incoming or outgoing nodes. FIG. 12 illustrates an example of a Generalized Structure 1 type structure 1201 where multiple superlinks flow into multiple upstream superlinks $X_n$) that has been labeled to indicate graph conditions as follows:

1. There are N (N>1) evaluated superlinks $X_n$ originating from the same node. Furthermore, $X_n$ have one or more incoming superlinks. In the most general case, there exist two types of incoming superlinks:
   a. K Incoming superlinks, $E_k$, which are also evaluated.
   b. M Incoming superlinks, $I_m$, which are not evaluated. Note that $I_m$ superlinks can be extended as long as the extended superlink flows only into $I_m$ superlinks and no other link. This is depicted in FIG. 12, where two superlinks make a merge and join $I_j$ ($I_M$ has a similar structure as well). Because $I_m$ superlinks are not evaluated (they do not have a closure likelihood score), they are assumed to be open by default.
2. Superlinks $X_n$ are the only upstream superlinks for all of $E_k$ and L.
3. Superlinks $X_n$ have been evaluated and have a closure likelihood score.

In one embodiment, when processing the roadway graphs exhibiting the example structure 1201, the resolution module 207 selects between matching the road closure state of a first road segment with the road closure state of second and matching the road closure state of the second road segment with the road closure state of the first road segment based calculating a sum of respective closure scores for the second road segment flowing into the first road segment and all other incoming road segments.

Figure 13:
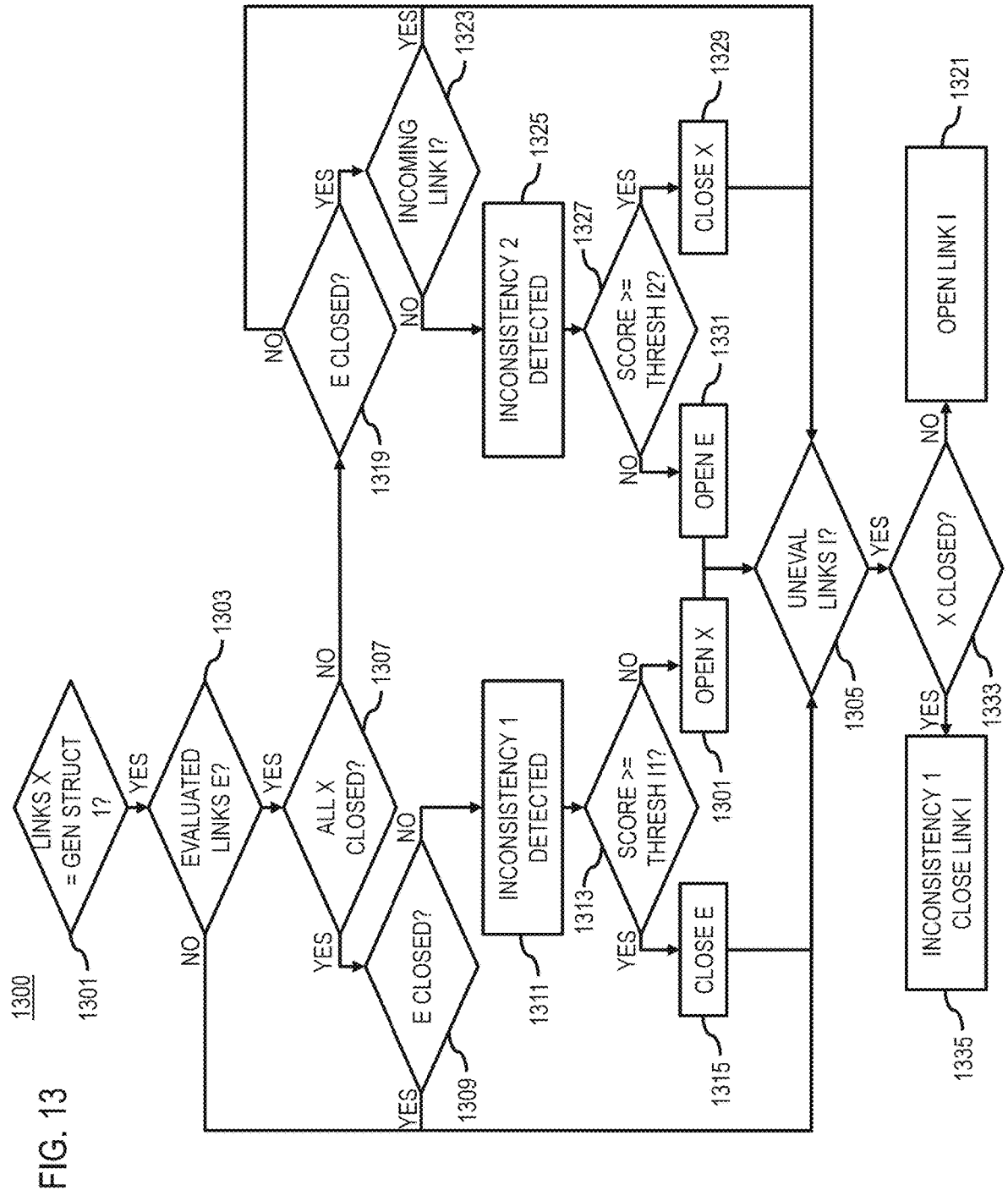
FIG. 13 is a flowchart of a process of resolving road closure inconsistencies in a roadway graph exhibiting a first generalized structure, according to one embodiment.

FIG. 13 illustrates a flowchart of an example process for resolving inconsistencies for roadway graphs exhibiting the structure 1201 of FIG. 12, according to one embodiment. In various embodiments, the mapping platform 111 and/or any of the modules 201-207 may perform one or more portions of the process 1300 and may be implemented in, for instance, a chip set including a processor and a memory as shown in FIG. 18. As such, the mapping platform 111 and/or any of the modules 201-207 can provide means for accomplishing various parts of the process 1300, as well as means for accomplishing embodiments of other processes described herein in conjunction with other components of the system 100. Although the process 1300 is illustrated and described as a sequence of steps, it is contemplated that various embodiments of the process 1300 may be performed in any order or combination and need not include all of the illustrated steps.

In step 1301, the resolution module 207 checks if there are any superlinks $X_n$ which fulfill the superlink graph conditions described above with respect to FIG. 12. If yes, the resolution module 207 proceeds to step 1303. Otherwise, the resolution module 207, takes no further action.

In step 1303, the resolution module 207 checks if superlinks $X_n$ have any evaluated incoming superlinks, $E_k$. In other words, the resolution module 207 checks whether any of the incoming superlinks has a recorded or stored road closure probability or score. If not, the resolution module 207 proceeds to step 1305 to check unevaluated incoming links.

If yes, the resolution module 207 checks whether the closure states of all superlinks $X_n$ are closed (step 1307), and then checks whether the closures states of all evaluated incoming links $E_k$ are closed (step 1309). IF the closure states of all superlinks $X_n$ and all evaluated incoming links $E_k$ are closed, the resolution module 207 proceeds to step 1305 to check unevaluated incoming links.

If all superlinks $X_n$ are closed, but one or more of the evaluated incoming links $E_k$ are open, the resolution module 207 determines that an Inconsistency 1 has been detected (step 1311). Based on the detection of Inconsistency 1, the resolution module 207 performs the following:

Calculate sum of (average closure score of superlinks $X_n$) and (average closure score for evaluated incoming links $E_k$) as follows:

score_sum=score$Xn$+mean(score$Ek$).

Compare the sum against a threshold (step 1313). By way of example, the threshold can be set based on ground truth observations or data of known closure states and their respective scores. In one embodiment, thresholds can be determined separately for each type of inconsistency.

If score_sum>=threshold I1, the resolution module 207 sets the closure state to closed for all evaluated incoming links $E_k$ (step 1315).

Otherwise, the resolution module 207 sets the closure states of all superlinks $X_n$ to open (step 1317).

The resolution module 207 then proceeds to step 1305 to check unevaluated incoming links.

If the resolution module 207 determines that at least one of the superlinks $X_n$ is open at step 1307, and that one or more evaluated incoming links $E_k$ are open at step 1319, the resolution module 207 proceeds to step 1321 to change the state of incoming links $I_m$ to open.

If the resolution module 207 determines that at least one of the superlinks $X_n$ is open at step 1307, all evaluated incoming links $E_k$ are closed at step 1319, and there is at least one $I_m$ superlink at step 1323, the resolution module 207 proceeds to step 1321 to change the state of unevaluated incoming superlinks $I_m$ to open.

If the resolution module 207 determines that at least one of the superlinks $X_n$ is open at step 1307, all evaluated incoming links $E_k$ are closed at step 1319, and there are no $I_m$ superlinks at 1323, then the resolution module 207 determines that an Inconsistency 2 has been detected (step 1325). Based on the detection of Inconsistency 2, the resolution module 207 performs the following:

Calculate sum of (average closure score of open superlinks $X_n$) and (average closure score for evaluated incoming links $E_k$) as follows:

score_sum=score$Xn$+mean(score$Ek$).

Compare the sum against a threshold (step 1327). By way of example, the threshold can be set based on ground truth observations or data of known closure states and their respective scores. In one embodiment, thresholds can be determined separately for each type of inconsistency.

If score_sum>=threshold I2, the resolution module 207 sets the closure state to closed for all open superlinks $X_n$ (step 1329).

Otherwise, the resolution module 207 sets the closure state to open for all evaluated incoming links $E_k$ (step 1331).

The resolution module 207 then proceeds to step 1305 to check unevaluated incoming links.

At step 1305, the resolution module 207 checks if superlinks Xn have any unevaluated incoming superlinks, Im. If not, the resolution module 207 terminates and takes no further action. If yes, the resolution module 207 checks whether all superlinks Xn are closed at step 1333. If all superlinks Xn are closed, the resolution module 207 determines that an Inconsistency 1 has been detected and then sets the closure states of all unevaluated incoming superlinks Im to closed (step 1335). If at least one superlink Xn is open, the resolution module 207 sets the closure states of all unevaluated incoming superlinks Im to open (step 1321).

Figure 14:
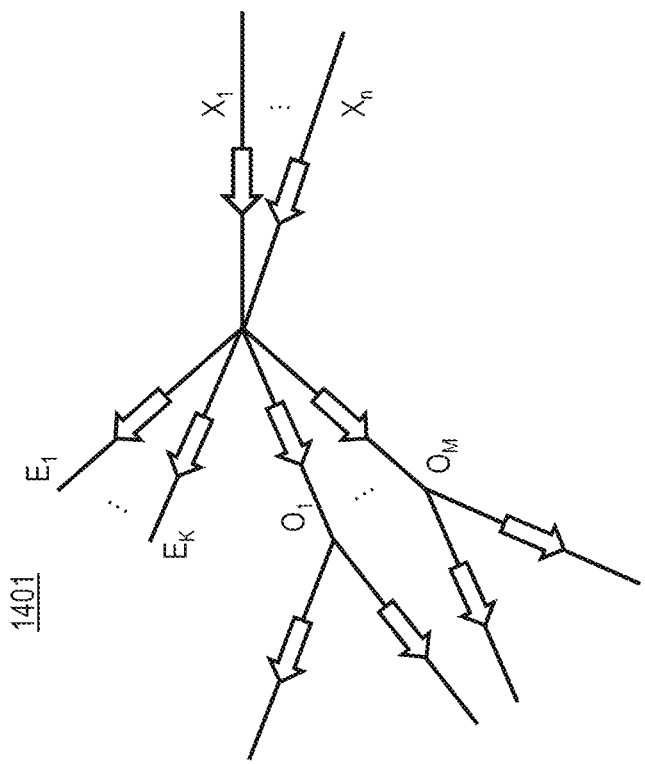
FIG. 14 is a diagram of an example second generalized roadway structure, according to one embodiment.

FIG. 14 illustrates an example of a Generalized Structure 2 type structure 1401 where multiple superlinks flow into multiple upstream superlinks Xn) that has been labeled to indicate graph conditions as follows:

1. There are N (N>1) evaluated superlinks $X_n$ originating from the same node. Furthermore, $X_n$ have one or more incoming superlinks. In the most general case, there exist two types of outgoing superlinks:
   a. K Outgoing superlinks, $E_k$, which are also evaluated.
   b. M Outgoing superlinks, $O_m$, which are not evaluated. Note that $O_m$ superlinks can be extended as long as the extended superlink flows only into $O_m$ superlinks and no other link. This is depicted in FIG. 14, where two superlinks make a merge and join $O_l$ ($O_M$ has a similar structure as well). Because $O_m$ superlinks are not evaluated (they do not have a closure likelihood score), they are assumed to be open by default.
2. Superlinks $X_n$ are the only downstream superlinks for all of $E_k$ and $I_m$.
3. Superlinks $X_n$ have been evaluated and have a closure likelihood score.

In one embodiment, when processing the roadway graphs exhibiting the example structure 1201, the resolution module 207 selects between matching the road closure state of a first road segment with the road closure state of second and matching the road closure state of the second road segment with the road closure state of the first road segment based calculating a sum of respective closure scores for the second road segment flowing into the first road segment and all other incoming road segments.

Figure 15:
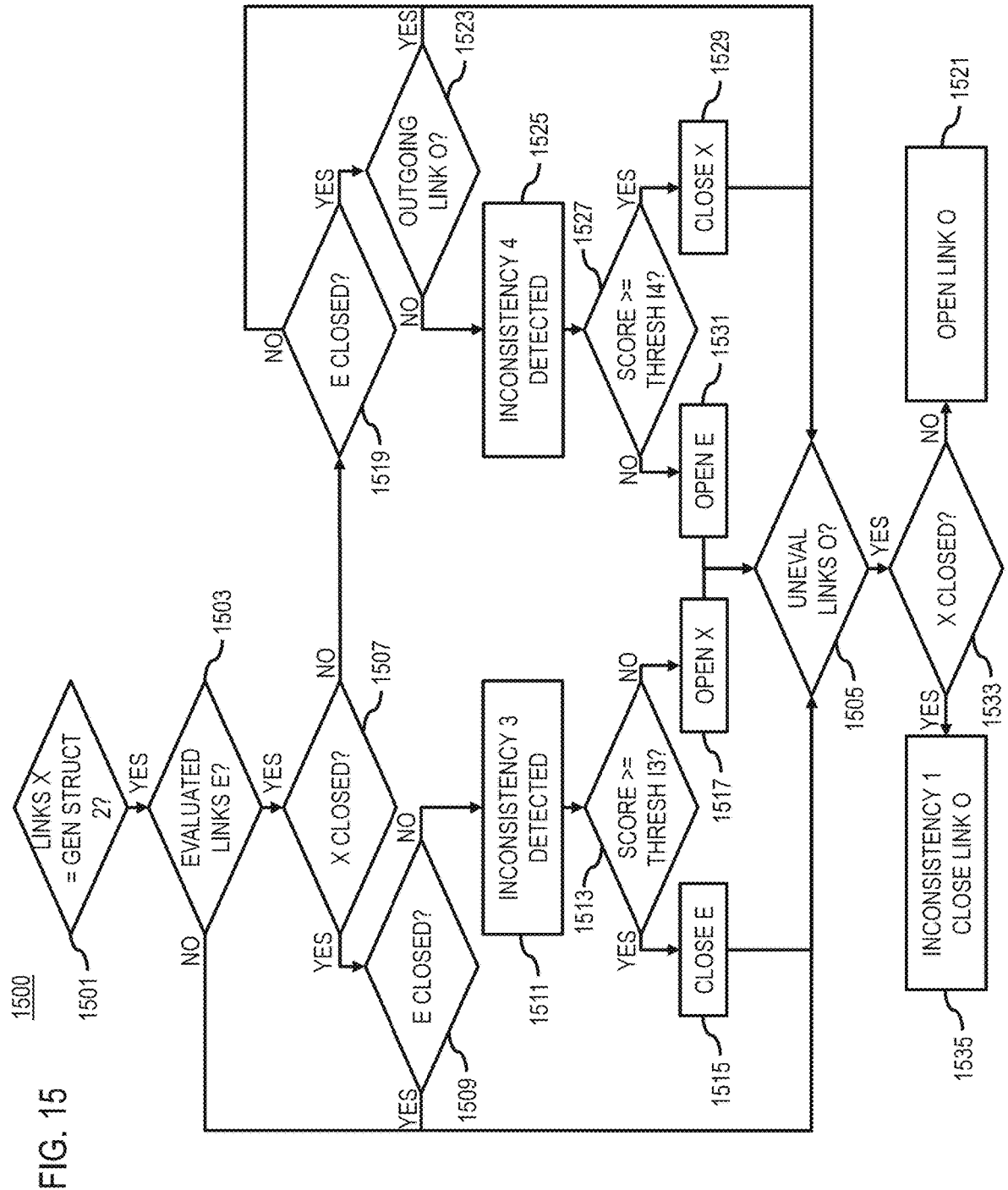
FIG. 15 is a flowchart of a process of resolving road closure inconsistencies in a roadway graph exhibiting a second generalized structure, according to one embodiment.

FIG. 15 illustrates a flowchart of an example process for resolving inconsistencies for roadway graphs exhibiting the structure 1401 of FIG. 14, according to one embodiment. In various embodiments, the mapping platform 111 and/or any of the modules 201-207 may perform one or more portions of the process 1100 and may be implemented in, for instance, a chip set including a processor and a memory as shown in FIG. 18. As such, the mapping platform 111 and/or any of the modules 201-207 can provide means for accomplishing various parts of the process 1400, as well as means for accomplishing embodiments of other processes described herein in conjunction with other components of the system 100. Although the process 1400 is illustrated and described as a sequence of steps, it is contemplated that various embodiments of the process 1400 may be performed in any order or combination and need not include all of the illustrated steps.

In step 1501, the resolution module 207 checks if there are any superlinks Xn which fulfill the superlink graph conditions described above with respect to FIG. 14. If yes, the resolution module 207 proceeds to step 1403. Otherwise, the resolution module 207, takes no further action.

In step 1503, the resolution module 207 checks if superlinks Xn have any evaluated outgoing superlinks, Ek. In other words, the resolution module 207 checks whether any of the outgoing superlinks has a recorded or stored road closure probability or score. If not, the resolution module 207 proceeds to step 1505 to check unevaluated outgoing links.

If yes, the resolution module 207 checks whether the closure states of all superlinks Xn are closed (step 1507), and then checks whether the closures states of all evaluated outgoing links Ek are closed (step 1509). IF the closure states of all superlinks Xn and all evaluated outgoing links Ek are closed, the resolution module 207 proceeds to step 1505 to check unevaluated outgoing links.

If all superlinks Xn are closed, but one or more of the evaluated outgoing links Ek are open, the resolution module 207 determines that an Inconsistency 3 has been detected (step 1511). Based on the detection of Inconsistency 3, the resolution module 207 performs the following:

Calculate sum of (average closure score of superlinks $X_n$) and (average closure score for evaluated outgoing links $E_k$) as follows:

$$\text{score\_sum} = \text{score}Xn + \text{mean}(\text{score}Ek).$$

Compare the sum against a threshold (step 1513). By way of example, the threshold can be set based on ground truth observations or data of known closure states and their respective scores. In one embodiment, thresholds can be determined separately for each type of inconsistency.

If score_sum>=threshold 13, the resolution module 207 sets the closure state to closed for all evaluated outgoing links $E_k$ (step 1515).

Otherwise, the resolution module 207 sets the closure state of all superlinks $X_n$ to open (step 1517).

The resolution module 207 then proceeds to step 1505 to check unevaluated outgoing links.

If the resolution module 207 determines that at least one of the superlinks Xn is open at step 1507, and that one or more evaluated outgoing links Ek are open at step 1519, the resolution module 207 proceeds to step 1521 to change the state of outgoing links Om to open.

If the resolution module 207 determines that at least one of the superlinks Xn is open at step 1507, all evaluated outgoing links Ek are closed at step 1519, and there is at least one Om superlink at step 1523, the resolution module 207 proceeds to step 1521 to change the state of unevaluated outgoing superlinks Om to open.

If the resolution module 207 determines that at least one of the superlinks Xn is open at step 1507, all evaluated outgoing links Ek are closed at step 1519, and there are no Om superlinks at 1523, then the resolution module 207 determines that an Inconsistency 4 has been detected (step 1525). Based on the detection of Inconsistency 4, the resolution module 207 performs the following:

Calculate sum of (average closure score of open superlinks $X_n$) and (average closure score for evaluated outgoing links $E_k$) as follows:

$$\text{score\_sum} = \text{score}Xn + \text{mean}(\text{score}Ek).$$

Compare the sum against a threshold (step 1527). By way of example, the threshold can be set based on ground truth observations or data of known closure states and their respective scores. In one embodiment, thresholds can be determined separately for each type of inconsistency.

If score_sum>=threshold 14, the resolution module 207 sets the closure state to closed for open superlinks $X_n$ (step 1529).

Otherwise, the resolution module 207 sets the closure state to open for all evaluated outgoing links $E_k$ (step 1531).

The resolution module 207 then proceeds to step 1505 to check unevaluated incoming links.

At step 1505, the resolution module 207 checks if superlinks Xn have any unevaluated outgoing superlinks, Om. If not, the resolution module 207 terminates and takes no further action. If yes, the resolution module 207 checks whether all superlinks Xn are closed at step 1533. If all superlinks Xn are closed, the resolution module 207 determines that an Inconsistency 3 has been detected and then sets the closure states of all unevaluated outgoing superlinks Om to closed (step 1535). If at least one of the superlinks Xn is open, the resolution module 207 sets the closure states of all unevaluated outgoing superlinks Om to open (step 1521).

In one embodiment, after performing inconsistency resolution on road closure data, the mapping platform 111 can output the processed data to the road closure data layer 119 of the geographic database 109 or equivalent data. The mapping platform 111 can then provide access to the closure data layer 119 to providing mapping services, navigation services, location-based services, and/or any other service using the resolved road closure data.

Returning to FIG. 1, in one embodiment, the mapping platform 111 has connectivity over a communication network 117 to other components of the system 100 including but not limited to road closure reports 101, services platform 103, services 105, content providers 107, geographic database 109, and/or vehicles 113 (e.g., probes). By way of example, the services 105 may also be other third-party services and include traffic incident services (e.g., to report road closures), mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 103 uses the output (e.g. physical divider predictions) of the mapping platform 111 to provide services such as navigation, mapping, other location-based services, etc.

In one embodiment, the mapping platform 111 may be a platform with multiple interconnected components. The mapping platform 111 may include multiple servers, intelligent networking devices, computing devices, components and corresponding software for providing parametric representations of lane lines. In addition, it is noted that the mapping platform 111 may be a separate entity of the system 100, a part of the one or more services 105, a part of the services platform 103, or included within the vehicle 113.

In one embodiment, content providers 107a-107m (collectively referred to as content providers 107) may provide content or data (e.g., including geographic data, parametric representations of mapped features, etc.) to the geographic database 109, the mapping platform 111, the services platform 103, the services 105, and the vehicle 113. The content provided may be any type of content, such as traffic incident content (e.g., road closure reports), map content, textual content, audio content, video content, image content, etc. In one embodiment, the content providers 107 may provide content that may aid in the detecting and classifying of road closures or other traffic incidents. In one embodiment, the content providers 107 may also store content associated with the geographic database 109, mapping platform 111, services platform 103, services 105, and/or vehicle 113. In another embodiment, the content providers 107 may manage access to a central repository of data, and offer a consistent, standard interface to data, such as a repository of the geographic database 109.

In one embodiment, the vehicles 113, for instance, are part of a probe-based system for collecting probe data for detecting traffic incidents and/or measuring traffic conditions in a road network. In one embodiment, each vehicle 113 is configured to report probe data as probe points, which are individual data records collected at a point in time that records telemetry data for that point in time. In one embodiment, the probe ID can be permanent or valid for a certain period of time. In one embodiment, the probe ID is cycled, particularly for consumer-sourced data, to protect the privacy of the source.

In one embodiment, a probe point can include attributes such as: (1) probe ID, (2) longitude, (3) latitude, (4) heading, (5) speed, and (6) time. The list of attributes is provided by way of illustration and not limitation. Accordingly, it is contemplated that any combination of these attributes or other attributes may be recorded as a probe point. For example, attributes such as altitude (e.g., for flight capable vehicles or for tracking non-flight vehicles in the altitude domain), tilt, steering angle, wiper activation, etc. can be included and reported for a probe point. In one embodiment, the vehicles 113 may include sensors 115 for reporting measuring and/or reporting attributes. The attributes can also be any attribute normally collected by an on-board diagnostic (OBD) system of the vehicle, and available through an interface to the OBD system (e.g., OBD II interface or other similar interface). In one embodiment, this data allows the system 100 to calculate or construct vehicle paths of a vehicle 113 over a stretch of road (e.g., over a closure link graph).

The probe points can be reported from the vehicles 113 in real-time, in batches, continuously, or at any other frequency requested by the system 100 over, for instance, the communication network 117 for processing by the mapping platform 111. The probe points also can be mapped to specific road links stored in the geographic database 109. In one embodiment, the system 100 can generate probe traces (e.g., vehicle paths or trajectories) from the probe points for an individual probe so that the probe traces represent a travel trajectory or vehicle path of the probe through the road network.

In one embodiment, the vehicle 113 is configured with various sensors 115 for generating or collecting vehicular sensor data, related geographic/map data, etc. In one embodiment, the sensed data represent sensor data associated with a geographic location or coordinates at which the sensor data was collected. In this way, the sensor data can act as observation data that can be separated into location-aware training and evaluation datasets according to their data collection locations as well as used for evaluating road closure reports according to the embodiments described herein. By way of example, the sensors may include a radar system, a LiDAR system, a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on steering wheels of the vehicles, switch sensors for determining whether one or more vehicle switches are engaged, and the like.

Other examples of sensors of the vehicle 113 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the vehicle 113 may detect the relative distance of the vehicle from a physical divider, a lane or roadway, the presence of other vehicles, pedestrians, traffic lights, potholes and any other objects, or a combination thereof. In one scenario, the sensors may detect weather data, traffic information, or a combination thereof. In one embodiment, the vehicle 113 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 117 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 111, services platform 103, services 105, vehicle 113, and/or content providers 107 communicate with each other and other components of the system 100 using well known, new or still developing protocols. In this context, a protocol includes a set of rules defining how the network nodes within the communication network 117 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 16:
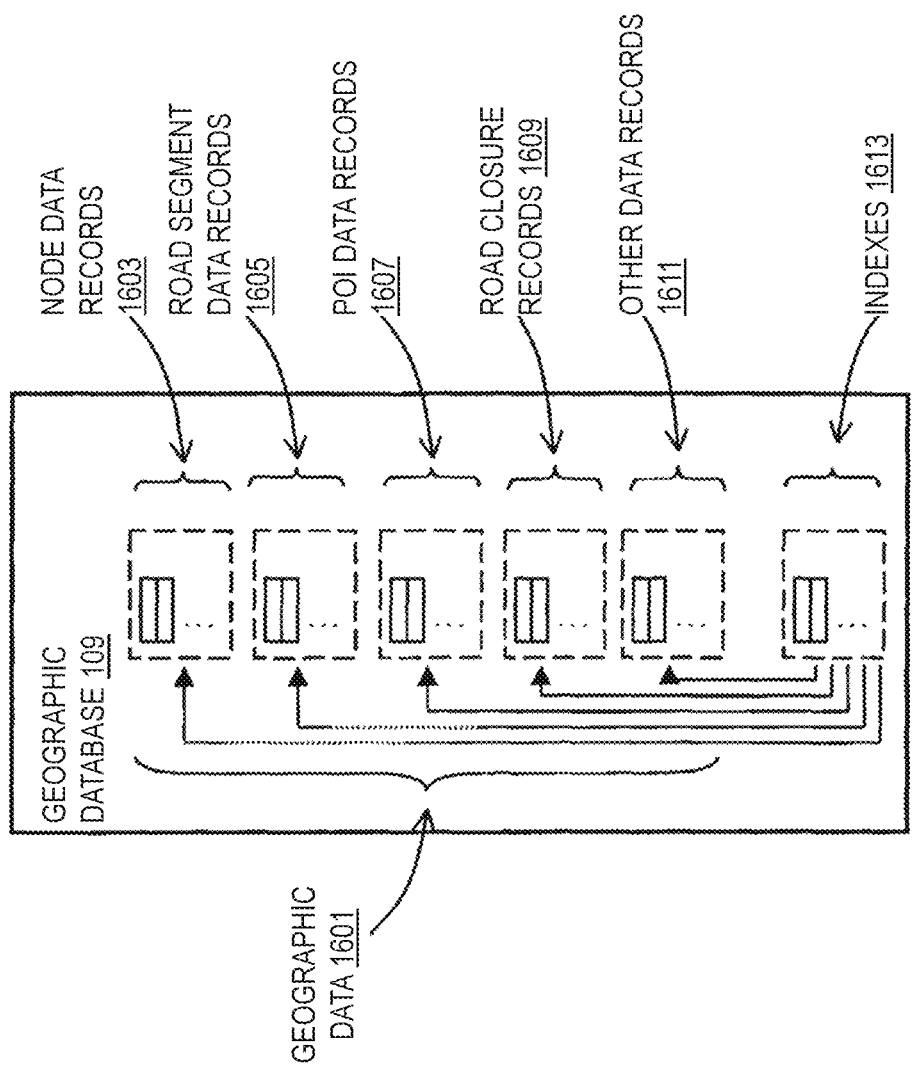
FIG. 16 is a diagram of a geographic database, according to one embodiment.

FIG. 16 is a diagram of a geographic database, according to one embodiment. In one embodiment, the geographic database 109 includes geographic data 1601 used for (or configured to be compiled to be used for) mapping and/or navigation-related services. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 109.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 109 follows certain conventions. For example, links do not cross themselves and do not cross each other except at a node. Also, there are no duplicated shape points, nodes, or links. Two links that connect each other have a common node. In the geographic database 109, overlapping geographic features are represented by overlapping polygons. When polygons overlap, the boundary of one polygon crosses the boundary of the other polygon. In the geographic database 109, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 109 includes node data records 1603, road segment or link data records 1605, POI data records 1607, road closure data records 1609, other records 1611, and indexes 1613, for example. More, fewer or different data records can be provided. In one embodiment, additional data records (not shown) can include cartographic ("carto") data records, routing data, and maneuver data. In one embodiment, the indexes 1613 may improve the speed of data retrieval operations in the geographic database 109. In one embodiment, the indexes 1613 may be used to quickly locate data without having to search every row in the geographic database 109 every time it is accessed. For example, in one embodiment, the indexes 1613 can be a spatial index of the polygon points associated with stored feature polygons.

In exemplary embodiments, the road segment data records 1605 are links or segments representing roads, streets, or paths, as can be used in the calculated route or recorded route information for determination of one or more personalized routes. The node data records 1603 are end points corresponding to the respective links or segments of the road segment data records 1605. The road link data records 1605 and the node data records 1603 represent a road network, such as used by vehicles, cars, and/or other entities. Alternatively, the geographic database 109 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 109 can include data about the POIs and their respective locations in the POI data records 1607. The geographic database 109 can also include data about places, such as cities, towns, or other communities, and other geographic features, such as bodies of water, mountain ranges, etc. Such place or feature data can be part of the POI data records 1607 or can be associated with POIs or POI data records 1607 (such as a data point used for displaying or representing a position of a city).

In one embodiment, the geographic database 109 includes the road closure data records 1609 for storing inconsistency-resolved road closure data, predicted road closure reports, road closure evaluations, road closure link graphs, associated probe data/vehicle paths, extracted features derived from the probe data, and/or any other related data. The road closure data records 1609 comprise of the road closure data layer 119 that store the automatically generated road closure classifications generated according to the various embodiments described herein. The road closure data layer 119 can be provided to other system components or end users to provided related mapping, navigation, and/or other location-based services. In one embodiment, the road closure data records 1609 can be associated with segments of a road link (as opposed to an entire link). It is noted that the segmentation of the road for the purposes of physical divider prediction can be different than the road link structure of the geographic database 109. In other words, the segments can further subdivide the links of the geographic database 109 into smaller segments (e.g., of uniform lengths such as 5-meters). In this way, road closures or other traffic incidents can be predicted and represented at a level of granularity that is independent of the granularity or at which the actual road or road network is represented in the geographic database 109. In one embodiment, the road closure data records 1609 can be associated with one or more of the node records 1603, road segment or link records 1605, and/or POI data records 1607; or portions thereof (e.g., smaller or different segments than indicated in the road segment records 1605) to provide situational awareness to drivers and provide for safer autonomous operation of vehicles.

In one embodiment, the geographic database 109 can be maintained by the content provider 107 in association with the services platform 103 (e.g., a map developer). The map developer can collect geographic data to generate and enhance the geographic database 109. There can be different ways used by the map developer to collect data. These ways can include obtaining data from other sources, such as municipalities or respective geographic authorities. In addition, the map developer can employ field personnel to travel by vehicle along roads throughout the geographic region to observe features (e.g., road closures or other traffic incidents, etc.) and/or record information about them, for example. Also, remote sensing, such as aerial or satellite photography, can be used.

In one embodiment, the geographic database 109 include high resolution or high definition (HD) mapping data that provide centimeter-level or better accuracy of map features. For example, the geographic database 109 can be based on Light Detection and Ranging (LiDAR) or equivalent technology to collect billions of 3D points and model road surfaces and other map features down to the number lanes and their widths. In one embodiment, the HD mapping data capture and store details such as the slope and curvature of the road, lane markings, roadside objects such as sign posts, including what the signage denotes. By way of example, the HD mapping data enable highly automated vehicles to precisely localize themselves on the road, and to determine road attributes (e.g., learned speed limit values) to at high accuracy levels.

In one embodiment, the geographic database 109 is stored as a hierarchical or multilevel tile-based projection or structure. More specifically, in one embodiment, the geographic database 109 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

The geographic database 109 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 113, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing road closure graph consistency resolution may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 17:
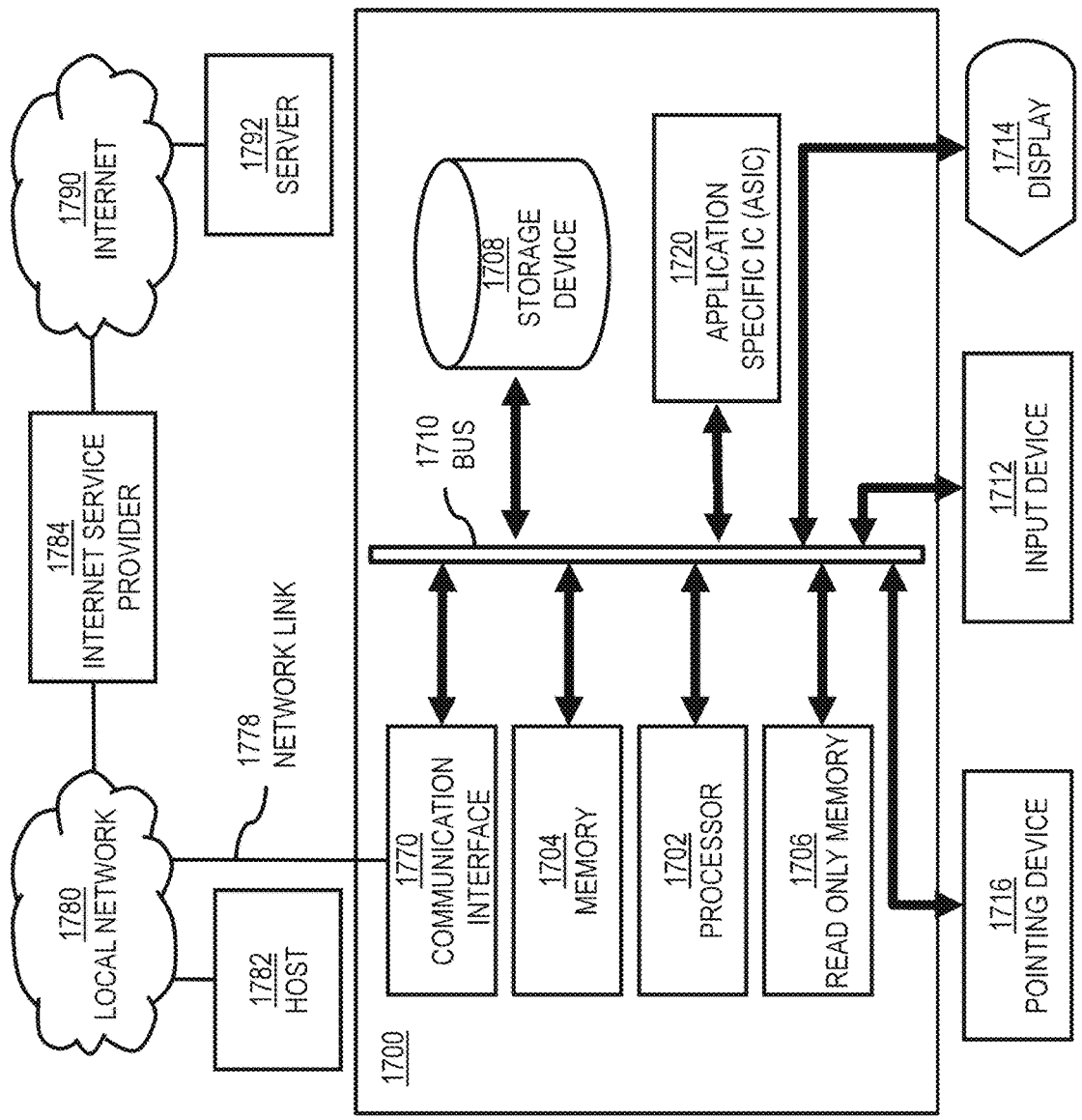
FIG. 17 is a diagram of hardware that can be used to implement an embodiment.

FIG. 17 illustrates a computer system 1700 upon which an embodiment of the invention may be implemented. Computer system 1700 is programmed (e.g., via computer program code or instructions) to provide road closure graph consistency resolution as described herein and includes a communication mechanism such as a bus 1710 for passing information between other internal and external components of the computer system 1700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1710 includes one or more parallel conductors of information so that information is transferred quickly among devices coupled to the bus 1710. One or more processors 1702 for processing information are coupled with the bus 1710.

A processor 1702 performs a set of operations on information as specified by computer program code related to providing road closure graph consistency resolution. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1710 and placing information on the bus 1710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1700 also includes a memory 1704 coupled to bus 1710. The memory 1704, such as a random access memory (RAM) or other dynamic storage device, stores information including processor instructions for providing road closure graph consistency resolution. Dynamic memory allows information stored therein to be changed by the computer system 1700. RAM allows a unit of information stored at a location called a memory address to be stored and retrieved independently of information at neighboring addresses. The memory 1704 is also used by the processor 1702 to store temporary values during execution of processor instructions. The computer system 1700 also includes a read only memory (ROM) 1706 or other static storage device coupled to the bus 1710 for storing static information, including instructions, that is not changed by the computer system 1700. Some memory is composed of volatile storage that loses the information stored thereon when power is lost. Also coupled to bus 1710 is a non-volatile (persistent) storage device 1708, such as a magnetic disk, optical disk or flash card, for storing information, including instructions, that persists even when the computer system 1700 is turned off or otherwise loses power.

Information, including instructions for providing road closure graph consistency resolution, is provided to the bus 1710 for use by the processor from an external input device 1712, such as a keyboard containing alphanumeric keys operated by a human user, or a sensor. A sensor detects conditions in its vicinity and transforms those detections into physical expression compatible with the measurable phenomenon used to represent information in computer system 1700. Other external devices coupled to bus 1710, used primarily for interacting with humans, include a display device 1714, such as a cathode ray tube (CRT) or a liquid crystal display (LCD), or plasma screen or printer for presenting text or images, and a pointing device 1716, such as a mouse or a trackball or cursor direction keys, or motion sensor, for controlling a position of a small cursor image presented on the display 1714 and issuing commands associated with graphical elements presented on the display 1714. In some embodiments, for example, in embodiments in which the computer system 1700 performs all functions automatically without human input, one or more of external input device 1712, display device 1714 and pointing device 1716 is omitted.

In the illustrated embodiment, special purpose hardware, such as an application specific integrated circuit (ASIC) 1720, is coupled to bus 1710. The special purpose hardware is configured to perform operations not performed by processor 1702 quickly enough for special purposes. Examples of application specific ICs include graphics accelerator cards for generating images for display 1714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1700 also includes one or more instances of a communications interface 1770 coupled to bus 1710. Communication interface 1770 provides a one-way or two-way communication coupling to a variety of external devices that operate with their own processors, such as printers, scanners and external disks. In general the coupling is with a network link 1778 that is connected to a local network 1780 to which a variety of external devices with their own processors are connected. For example, communication interface 1770 may be a parallel port or a serial port or a universal serial bus (USB) port on a personal computer. In some embodiments, communications interface 1770 is an integrated services digital network (ISDN) card or a digital subscriber line (DSL) card or a telephone modem that provides an information communication connection to a corresponding type of telephone line. In some embodiments, a communication interface 1770 is a cable modem that converts signals on bus 1710 into signals for a communication connection over a coaxial cable or into optical signals for a communication connection over a fiber optic cable. As another example, communications interface 1770 may be a local area network (LAN) card to provide a data communication connection to a compatible LAN, such as Ethernet. Wireless links may also be implemented. For wireless links, the communications interface 1770 sends or receives or both sends and receives electrical, acoustic or electromagnetic signals, including infrared and optical signals, that carry information streams, such as digital data. For example, in wireless handheld devices, such as mobile telephones like cell phones, the communications interface 1770 includes a radio band electromagnetic transmitter and receiver called a radio transceiver. In certain embodiments, the communications interface 1770 enables connection to the communication network 117 for providing road closure graph consistency resolution.

The term computer-readable medium is used herein to refer to any medium that participates in providing information to processor 1702, including instructions for execution. Such a medium may take many forms, including, but not limited to, non-volatile media, volatile media and transmission media. Non-volatile media include, for example, optical or magnetic disks, such as storage device 1708. Volatile media include, for example, dynamic memory 1704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 18 illustrates a chip set 1800 upon which an embodiment of the invention may be implemented. Chip set 1800 is programmed to provide road closure graph consistency resolution as described herein and includes, for instance, the processor and memory components described with respect to FIG. 17 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1800 includes a communication mechanism such as a bus 1801 for passing information among the components of the chip set 1800. A processor 1803 has connectivity to the bus 1801 to execute instructions and process information stored in, for example, a memory 1805. The processor 1803 may include one or more processing cores with each core configured to perform independently. A multi-core processor enables multiprocessing within a single physical package. Examples of a multi-core processor include two, four, eight, or greater numbers of processing cores. Alternatively or in addition, the processor 1803 may include one or more microprocessors configured in tandem via the bus 1801 to enable independent execution of instructions, pipelining, and multithreading. The processor 1803 may also be accompanied with one or more specialized components to perform certain processing functions and tasks such as one or more digital signal processors (DSP) 1807, or one or more application-specific integrated circuits (ASIC) 1809. A DSP 1807 typically is configured to process real-world signals (e.g., sound) in real time independently of the processor 1803. Similarly, an ASIC 1809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1803 and accompanying components have connectivity to the memory 1805 via the bus 1801. The memory 1805 includes both dynamic memory (e.g., RAM, magnetic disk, writable optical disk, etc.) and static memory (e.g., ROM, CD-ROM, etc.) for storing executable instructions that when executed perform the inventive steps described herein to provide road closure graph consistency resolution. The memory 1805 also stores the data associated with or generated by the execution of the inventive steps.

Figure 19:
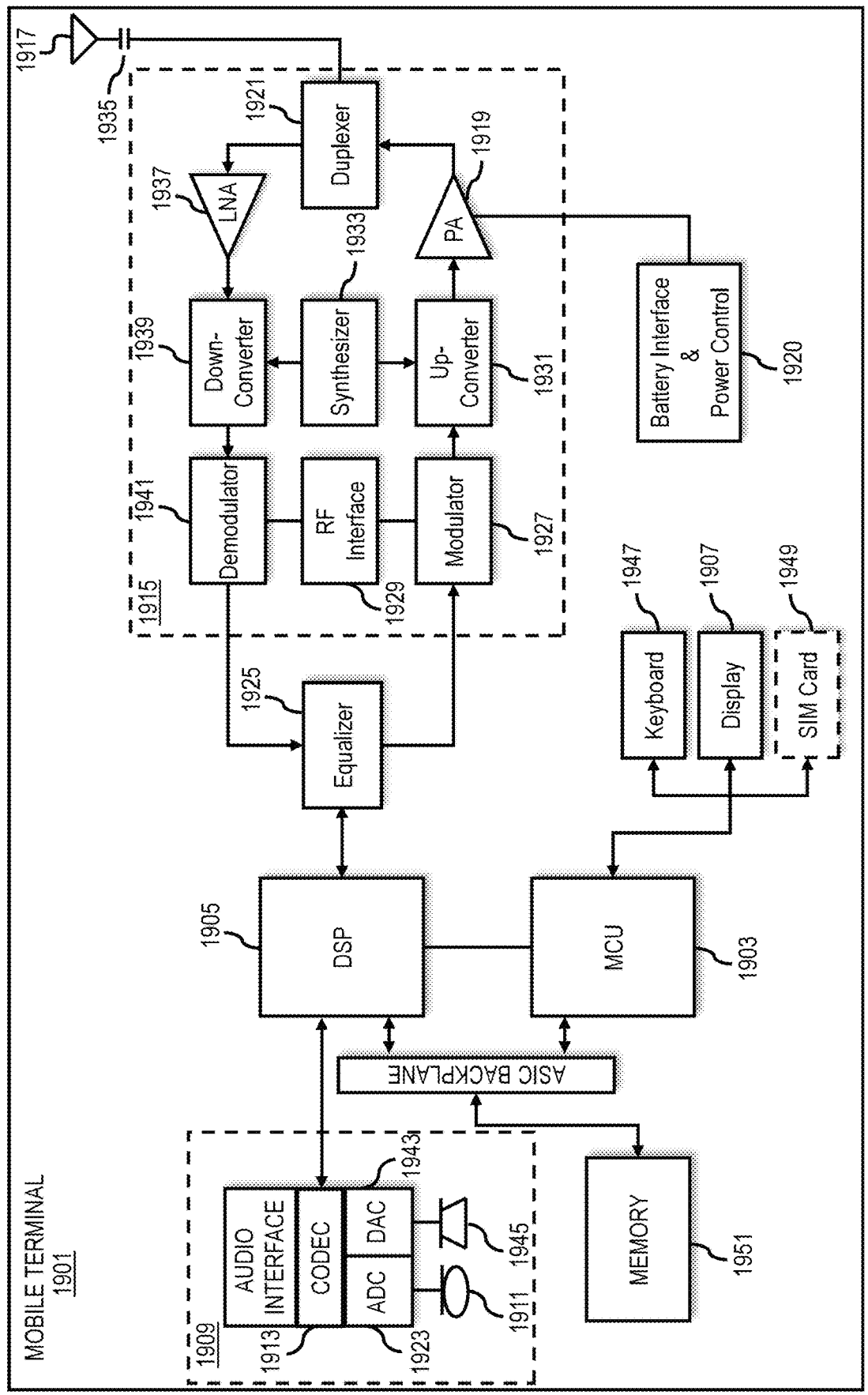
FIG. 19 is a diagram of a mobile terminal (e.g., handset or vehicle or part thereof) that can be used to implement an embodiment.

FIG. 19 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1903, a Digital Signal Processor (DSP) 1905, and a receiver/transmitter unit including a microphone gain control unit and a speaker gain control unit. A main display unit 1907 provides a display to the user in support of various applications and mobile station functions that offer automatic contact matching. An audio function circuitry 1909 includes a microphone 1911 and microphone amplifier that amplifies the speech signal output from the microphone 1911. The amplified speech signal output from the microphone 1911 is fed to a coder/decoder (CODEC) 1913.

A radio section 1915 amplifies power and converts frequency in order to communicate with a base station, which is included in a mobile communication system, via antenna 1917. The power amplifier (PA) 1919 and the transmitter/modulation circuitry are operationally responsive to the MCU 1903, with an output from the PA 1919 coupled to the duplexer 1921 or circulator or antenna switch, as known in the art. The PA 1919 also couples to a battery interface and power control unit 1920.

In use, a user of mobile station 1901 speaks into the microphone 1911 and his or her voice along with any detected background noise is converted into an analog voltage. The analog voltage is then converted into a digital signal through the Analog to Digital Converter (ADC) 1923. The control unit 1903 routes the digital signal into the DSP 1905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1925 for compensation of any frequency-dependent impairments that occur during transmission though the air such as phase and amplitude distortion. After equalizing the bit stream, the modulator 1927 combines the signal with a RF signal generated in the RF interface 1929. The modulator 1927 generates a sine wave by way of frequency or phase modulation. In order to prepare the signal for transmission, an up-converter 1931 combines the sine wave output from the modulator 1927 with another sine wave generated by a synthesizer 1933 to achieve the desired frequency of transmission. The signal is then sent through a PA 1919 to increase the signal to an appropriate power level. In practical systems, the PA 1919 acts as a variable gain amplifier whose gain is controlled by the DSP 1905 from information received from a network base station. The signal is then filtered within the duplexer 1921 and optionally sent to an antenna coupler 1935 to match impedances to provide maximum power transfer. Finally, the signal is transmitted via antenna 1917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1901 are received via antenna 1917 and immediately amplified by a low noise amplifier (LNA) 1937. A down-converter 1939 lowers the carrier frequency while the demodulator 1941 strips away the RF leaving only a digital bit stream. The signal then goes through the equalizer 1925 and is processed by the DSP 1905. A Digital to Analog Converter (DAC) 1943 converts the signal and the resulting output is transmitted to the user through the speaker 1945, all under control of a Main Control Unit (MCU) 1903—which can be implemented as a Central Processing Unit (CPU) (not shown).

The MCU 1903 receives various signals including input signals from the keyboard 1947. The keyboard 1947 and/or the MCU 1903 in combination with other user input components (e.g., the microphone 1911) comprise a user interface circuitry for managing user input. The MCU 1903 runs a user interface software to facilitate user control of at least some functions of the mobile station 1901 to provide road closure graph consistency resolution. The MCU 1903 also delivers a display command and a switch command to the display 1907 and to the speech output switching controller, respectively. Further, the MCU 1903 exchanges information with the DSP 1905 and can access an optionally incorporated SIM card 1949 and a memory 1951. In addition, the MCU 1903 executes various control functions required of the station. The DSP 1905 may, depending upon the implementation, perform any of a variety of conventional digital processing functions on the voice signals. Additionally, DSP 1905 determines the background noise level of the local environment from the signals detected by microphone 1911 and sets the gain of microphone 1911 to a level selected to compensate for the natural tendency of the user of the mobile station 1901.

The CODEC 1913 includes the ADC 1923 and DAC 1943. The memory 1951 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1951 may be, but not limited to, a single memory, CD, DVD, ROM, RAM, EEPROM, optical storage, or any other non-volatile or non-transitory storage medium capable of storing digital data.

An optionally incorporated SIM card 1949 carries, for instance, important information, such as the cellular phone number, the carrier supplying service, subscription details, and security information. The SIM card 1949 serves primarily to identify the mobile station 1901 on a radio network. The card 1949 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for resolving an inconsistency in road closure data stored in a mapping platform comprising:

processing, by one or more processors, map data to generate a roadway graph representing a spatial relationship between a first road segment and a plurality of second road segments, wherein each of the road segments is defined between an incoming node and an outgoing node, wherein the second road segments include either all road segments with respective outgoing nodes directly connecting with an incoming node of the first road segment without intermediate node or road segment in-between, or all road segments with respective incoming nodes directly connecting with an outgoing node of the first road segment without an intermediate node or road segment in-between, and wherein the spatial relationship indicates that a first closure state of the first road segment cannot differ from a second closure state of the second road segments;

determining, by the one or more processors, that the inconsistency in the road closure data indicates that the first closure state of the first road segment and the second closure state of the second road segments do not match;

in response to the inconsistency, changing, by the one or more processors, the road closure data stored in the mapping platform either to match the first road closure state with the second road closure state, or to match the second road closure state with the first road closure state; and generating, by the one or more processors, a road closure report for display on a user device, wherein the road closure report comprises the changed road closure data stored in the mapping platform.

2. The method of claim 1, wherein the first road closure state, the second road closure state, or a combination thereof is determined based on a journalistic report, an automatic road closure verification using probe data collected from one or more vehicles, or a combination thereof.

3. The method of claim 1, further comprising:

selecting between matching the first road closure state with the second road closure state and matching the second road closure state with the first road closure state based on closure score data calculated for the first road segment, the second road segment, or a combination thereof.

4. The method of claim 1, wherein the inconsistency is based on determining that:

the roadway graph indicates that the second road segments are the incoming road segment that flows into the first road segment;
the first road closure state is closed; and
the second road closure state is open.

5. The method of claim 1, wherein the inconsistency is based on determining that:

the roadway graph indicates that the second road segments are the incoming road segment that flows into the first road segment;
the first road closure state is open;
the second road closure state is closed; and
all other incoming road segments flowing into the first road segment are closed.

6. The method of claim 5, further comprising:

selecting between matching the first road closure state with the second road closure state and matching the second road closure state with the first road closure state based calculating a sum of respective closure scores for the second road segments and said all other incoming road segments.

7. The method of claim 1, wherein the inconsistency is based on determining that:

the roadway graph indicates that the second road segments are the outgoing road segment that flows from the first road segment;
the first road closure state is closed; and
the second road closure state is open.

8. The method of claim 1, wherein the inconsistency is based on determining that:

the roadway graph indicates that the second road segments are the outgoing road segment that flows from the first road segment;
the first road closure state is open;
the second road closure state is closed; and
all other outgoing road segments flowing from the first road segment are closed.

9. The method of claim 8, further comprising:

selecting between matching the first road closure state with the second road closure state or matching the second road closure state with the first road closure state based calculating a sum of respective closure scores for the second road segments and said all other outgoing road segments.

10. The method of claim 1, wherein the first road segment includes a first plurality of road segments exhibiting the first closure state.

11. An apparatus for resolving an inconsistency in road closure data stored in a mapping platform comprising:

at least one processor; and
at least one memory including computer program code for one or more programs,
the at least one memory and the computer program code configured to, with the at least one processor, cause the apparatus to perform at least the following,
process map data to generate a roadway graph representing a spatial relationship between a first road segment and a plurality of second road segments, wherein each of the road segments is defined between an incoming node and an outgoing node, wherein the second road segments include either all road segments with respective outgoing nodes directly connecting with an incoming node of the first road segment without intermediate node or road segment in-between, or all road segments with respective incoming nodes directly connecting with an outgoing node of the first road segment without intermediate node or road segment in-between, and wherein the spatial relationship indicates that a first closure state of the first road segment cannot differ from a second closure state of the second road segments;

determine that the inconsistency in the road closure data indicates that the first closure state of the first road segment and the second closure state of the second road segments do not match;

in response to the inconsistency, change the road closure data stored in the mapping platform either to match the first road closure state with the second road closure state, or to match the second road closure state with the first road closure state; and generate a road closure report for display on a user device, wherein the road closure report comprises the changed road closure data stored in the mapping platform.

12. The apparatus of claim 11, wherein the first road closure state, the second road closure state, or a combination thereof is determined based on a journalistic report, an automatic road closure verification using probe data collected from one or more vehicles, or a combination thereof.

13. The apparatus of claim 11, wherein the apparatus is further caused to:
selecting between matching the first road closure state with the second road closure state and matching the second road closure state with the first road closure state based on closure score data calculated for the first road segment, the second road segments, or a combination thereof.

14. The apparatus of claim 11, wherein the inconsistency is based on determining that:
the roadway graph indicates that the second road segments are the incoming road segment that flows into the first road segment;
the first road closure state is closed; and
the second road closure state is open.

15. The apparatus of claim 11, wherein the inconsistency is based on determining that:
the roadway graph indicates that the second road segments are the incoming road segment that flows into the first road segment;
the first road closure state is open;
the second road closure state is closed; and
all other incoming road segments flowing into the first road segment are closed.

16. A non-transitory computer-readable storage medium for resolving an inconsistency in road closure data stored in a mapping platform, carrying one or more sequences of one or more instructions which, when executed by one or more processors, cause an apparatus to perform:
processing map data to generate a roadway graph representing a spatial relationship between a first road segment and a plurality of second road segments, wherein each of the road segments is defined between an incoming node and an outgoing node, wherein the second road segments include either all road segments with respective outgoing nodes directly connecting with an incoming node of the first road segment without intermediate node or road segment in-between, or all road segments with respective incoming nodes directly connecting with an outgoing node of the first road segment without intermediate node or road segment in-between, and wherein the spatial relationship indicates that a first closure state of the first road segment cannot differ from a second closure state of the second road segments;

determining that the inconsistency in the road closure data indicates that the first closure state of the first road segment and the second closure state of the second road segments do not match;

in response to the inconsistency, changing the road closure data stored in the mapping platform either to match the first road closure state with the second road closure state, or to match the second road closure state with the first road closure state; and generating a road closure report for display on a user device, wherein the road closure report comprises the changed road closure data stored in the mapping platform.

17. The non-transitory computer-readable storage medium of claim 16, wherein the first road closure state, the second road closure state, or a combination thereof is determined based on a journalistic report, an automatic road closure verification using probe data collected from one or more vehicles, or a combination thereof.

18. The non-transitory computer-readable storage medium of claim 16, wherein the apparatus is caused to further perform:
selecting between matching the first road closure state with the second road closure state and matching the second road closure state with the first road closure state based on closure score data calculated for the first road segment, the second road segments, or a combination thereof.

19. The non-transitory computer-readable storage medium of claim 16, wherein the inconsistency is based on determining that:
the roadway graph indicates that the second road segments are the incoming road segment that flows into the first road segment;
the first road closure state is closed; and
the second road closure state is open.

20. The non-transitory computer-readable storage medium of claim 16, wherein the inconsistency is based on determining that:
the roadway graph indicates that the second road segments are the incoming road segment that flows into the first road segment;
the first road closure state is open;
the second road closure state is closed; and
all other incoming road segments flowing into the first road segment are closed.

* * * * *